United States Patent
Isenhour et al.

(10) Patent No.: US 10,180,539 B2
(45) Date of Patent: Jan. 15, 2019

(54) FIELD-INSTALLABLE FIBER OPTIC CONNECTORS AND RELATED CABLE ASSEMBLIES

(71) Applicant: Corning Cable Systems LLC, Hickory, NC (US)

(72) Inventors: Micah Colen Isenhour, Lincolnton, NC (US); Dennis Michael Knecht, Hickory, NC (US); James Phillip Luther, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 655 days.

(21) Appl. No.: 13/902,039

(22) Filed: May 24, 2013

(65) Prior Publication Data

US 2013/0259428 A1    Oct. 3, 2013

Related U.S. Application Data

(63) Continuation of application No. PCT/US2011/062368, filed on Nov. 29, 2011.

(Continued)

(51) Int. Cl.
*G02B 6/38* (2006.01)
*G02B 6/24* (2006.01)
(Continued)

(52) U.S. Cl.
CPC ............... *G02B 6/241* (2013.01); *G02B 6/32* (2013.01); *G02B 6/3817* (2013.01);
(Continued)

(58) Field of Classification Search
CPC ....... G02B 6/38; G02B 6/3802; G02B 6/3858
(Continued)

(56) References Cited

U.S. PATENT DOCUMENTS

| 4,986,626 A | 1/1991 | Bossard |
| 5,074,638 A | 12/1991 | Poli et al. ....................... 385/50 |

(Continued)

FOREIGN PATENT DOCUMENTS

| EP | 0070098 A2 | 1/1983 |
| EP | 0517346 A1 | 12/1992 |

(Continued)

OTHER PUBLICATIONS

Patent Cooperation Treaty, International Search Report for International Application No. PCT/US2011/062368; dated Jul. 5, 2012—5 pages.

(Continued)

*Primary Examiner* — Eric Wong
(74) *Attorney, Agent, or Firm* — Michael E. Carroll, Jr.

(57) ABSTRACT

Field-installable mechanical splice connectors for making optical and/or electrical connections in the field are disclosed. One embodiment is a hybrid mechanical splice connector having an electrical portion and an optical portion that includes at least one electrical contact, a shell, and at least one body for receiving at least one field optical fiber and securing the electrical contact. The connector includes a mechanical retention component for securing at least one optical field fiber to the at least one body. Another embodiment is directed to a mechanical splice connector having at least one body for receiving at least one field optical fiber, a mechanical retention component for securing at least one optical field fiber to the at least one body, and at least one lens attached to the at least one body.

22 Claims, 22 Drawing Sheets

Related U.S. Application Data

(60) Provisional application No. 61/418,160, filed on Nov. 30, 2010.

(51) Int. Cl.
*G02B 6/32* (2006.01)
*H01R 13/73* (2006.01)
*H01R 24/62* (2011.01)
*H01R 107/00* (2006.01)

(52) U.S. Cl.
CPC ......... *G02B 6/3846* (2013.01); *G02B 6/3887* (2013.01); *G02B 6/3897* (2013.01); *H01R 13/73* (2013.01); *H01R 24/62* (2013.01); *G02B 6/387* (2013.01); *G02B 6/3839* (2013.01); *G02B 6/3885* (2013.01); *H01R 2107/00* (2013.01)

(58) Field of Classification Search
USPC .................................................. 385/69, 86
See application file for complete search history.

(56) References Cited

U.S. PATENT DOCUMENTS

| | | | |
|---|---|---|---|
| 5,242,315 A | 9/1993 | O'Dea ........................... 439/577 |
| 6,293,708 B1 | 9/2001 | Ohtsuka et al. ................ 385/72 |
| 6,379,054 B2 | 4/2002 | Throckmorton et al. ...... 385/66 |
| 6,439,780 B1 | 8/2002 | Mudd et al. .................... 385/83 |
| 6,491,443 B1 | 12/2002 | Serizawa et al. |
| 6,623,172 B1 | 9/2003 | de Jong et al. ................. 385/59 |
| 6,816,661 B1 | 11/2004 | Barnes et al. ................ 385/134 |
| 7,104,702 B2 | 9/2006 | Barnes et al. .................. 385/77 |
| 8,254,743 B2 | 8/2012 | Sato |
| 2006/0165343 A1 | 7/2006 | Seifert |
| 2007/0123089 A1 | 5/2007 | Nishio et al. |
| 2008/0107381 A1* | 5/2008 | Nishioka ............... G02B 6/3829 385/60 |
| 2010/0046891 A1 | 2/2010 | Sabo |
| 2010/0046892 A1 | 2/2010 | Milette et al. |
| 2010/0158448 A1 | 6/2010 | Yi et al. .......................... 385/74 |
| 2010/0290745 A1 | 11/2010 | Liao et al. ...................... 385/90 |
| 2011/0249947 A1 | 10/2011 | Wang et al. |
| 2013/0071070 A1 | 3/2013 | Song et al. |

FOREIGN PATENT DOCUMENTS

| | | |
|---|---|---|
| JP | 2007121888 A | 5/2007 |
| TW | M324885 | 1/2008 |
| TW | 200821652 | 5/2008 |
| TW | M385116 | 7/2010 |
| WO | 2000075704 A1 | 12/2000 |
| WO | WO 00/75704 A1 | 12/2000 |
| WO | 2008108582 A1 | 9/2008 |
| WO | WO 2009/030982 A2 | 3/2009 |
| WO | WO 2009/152303 A2 | 12/2009 |

OTHER PUBLICATIONS

EP11794900.8 Office Action dated Jul. 11, 2013.
TW101111736 Search Report dated Mar. 8, 2016.
European Examination Report App No. 11794900.8 dated May 9, 2016. 11 Pgs.
TW100144062 Search Report dated May 24, 2016, 1. Pg.
European Exam Report 11805275.2 dated Jun. 27, 2016.
International Search Report and Written Opinion PCT/US2011/062362, dated Jul. 5, 2012.

\* cited by examiner

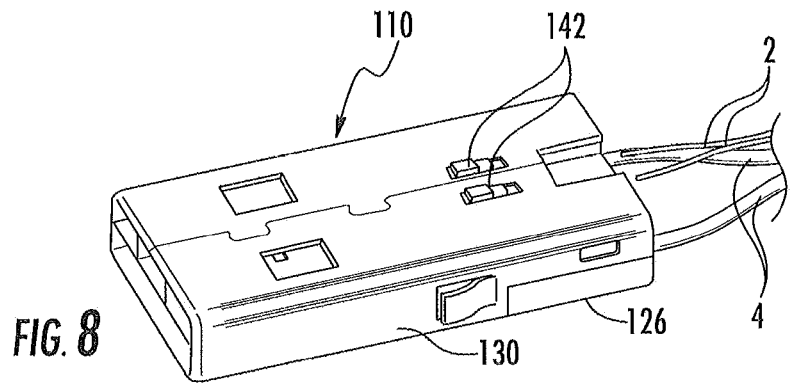
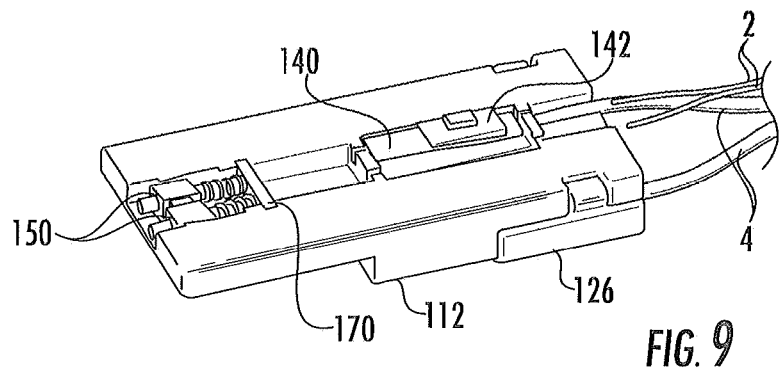
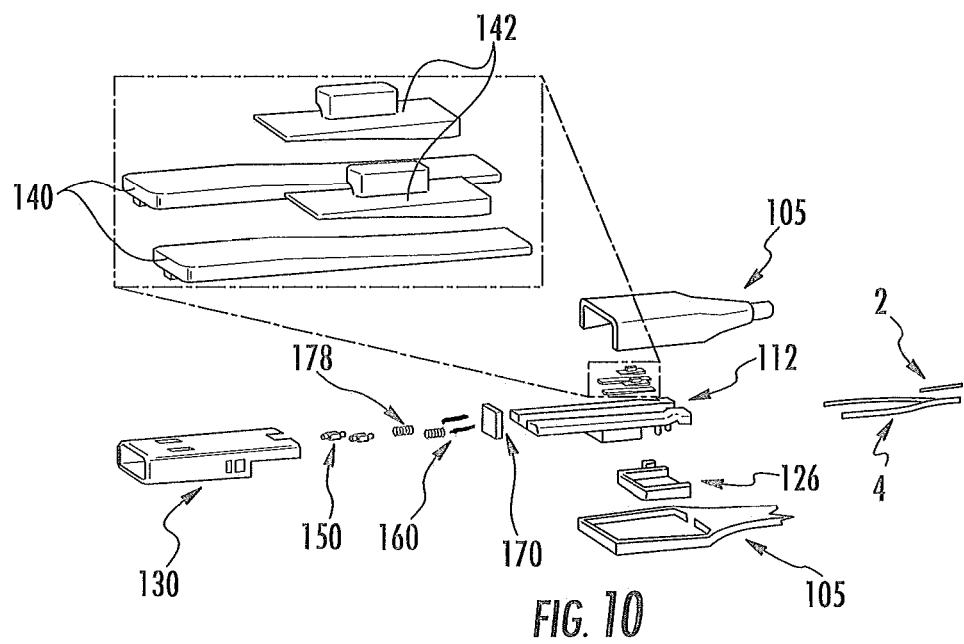

FIELD-INSTALLABLE FIBER OPTIC CONNECTORS AND RELATED CABLE ASSEMBLIES

RELATED APPLICATIONS

This application is a continuation of International Application No. PCT/US11/62368 filed Nov. 29, 2011, which claims the benefit of priority to U.S. Application No. 61/418,160, filed Nov. 30, 2010, both applications being incorporated herein by reference.

BACKGROUND

The disclosure is directed to field-installable optical fiber connectors and related fiber optic cable assemblies. More specifically, the disclosure is directed to field-installable fiber optic connectors suitable for use with consumer electronics and related fiber optic cable assemblies.

Optical fiber is increasingly being used for a variety of applications, including but not limited to broadband voice, video, and data transmission. As consumer devices are steadily using more bandwidth, connectors for these devices will likely move away from electrical connectors and toward using optical connections for increased bandwidth. Generally speaking, conventional fiber optic connectors used for telecommunication networks and the like are not suitable for consumer devices. For instance, conventional fiber optic connectors are relatively large compared with the consumer devices and their interfaces. Additionally, conventional fiber optic connectors are deployed with great care into relatively clean environments and/or cleaned by the craft before connecting the same. Further, even though fiber optic connectors are reconfigurable (i.e., suitable for mating/unmating) they are not intended for a relatively large number of mating cycles. Instead, conventional fiber optic connectors are high precision connectors designed for reducing insertion loss between mating connectors in the optical network.

On the other hand, the consumer electronic devices are expected to have a relatively large number of mating/unmating cycles during ordinary operation. The consumer electronic devices will be operated in a multitude of environments where dirt, dust, and other debris is encountered on a regular basis. Further, consumer electronic devices typically have size and space constraints for making connections. Consequently, there is an unresolved need for fiber optic connectors suitable for consumer devices.

SUMMARY

The disclosure is directed to mechanical splice connectors for providing optical connectivity in the field. Some embodiments are hybrid mechanical splice connectors for making both an electrical and optical connections along with associated cable assemblies. Other variations of mechanical splice connectors only have optical connectivity and may use one or mores lenses and/or a diffractive cover for protecting the mating interface. More specifically, the disclosure is directed to mechanical splice connectors that are suitable for field installation by the craft for making a quick, easy, and reliable optical and/or electrical connection.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIG. 1b is an exploded view of another explanatory hybrid mechanical splice fiber optic connector that is similar to FIG. 1, but includes a cover at the mating interface of the connector;

FIGS. 8 and 9 depict a subassembly hybrid mechanical splice fiber optic connector of FIG. 6 shown respectively with a shell and with the shell removed;

FIG. 10 is an exploded view of the explanatory hybrid mechanical splice fiber optic connector of FIG. 6 shown with an explanatory mechanical optical splice assembly;

DETAILED DESCRIPTION

Reference will now be made in detail to the preferred embodiments of the disclosure, examples of which are illustrated in the accompanying drawings. Whenever possible, like reference numbers will be used to refer to like components or parts.

Disclosed are mechanical splice connectors solely having optical connectivity as well as mechanical splice connectors have hybrid connectivity. As used herein, hybrid mechanical splice connectors and/or assemblies described herein are suitable for making optical and electrical connections for a variety of devices such as consumer electronics. Additionally, many embodiments are optionally shown as having hybrid connectivity the embodiments can be modified to solely have optical connectivity. Whether the disclosed mechanical splice connectors are solely optical or hybrid connectors they are advantageous since they allow optical connection by the user in the field for a simple, quick, and economical connection. Moreover, the hybrid connectors disclosed are robust for the relatively large number of mating cycles that consumer electronics experience. Reference will now be made in detail to the preferred embodiments, examples of which are illustrated in the accompanying drawings. Whenever possible, like reference numbers will be used to refer to like components or parts.

Figure 1:
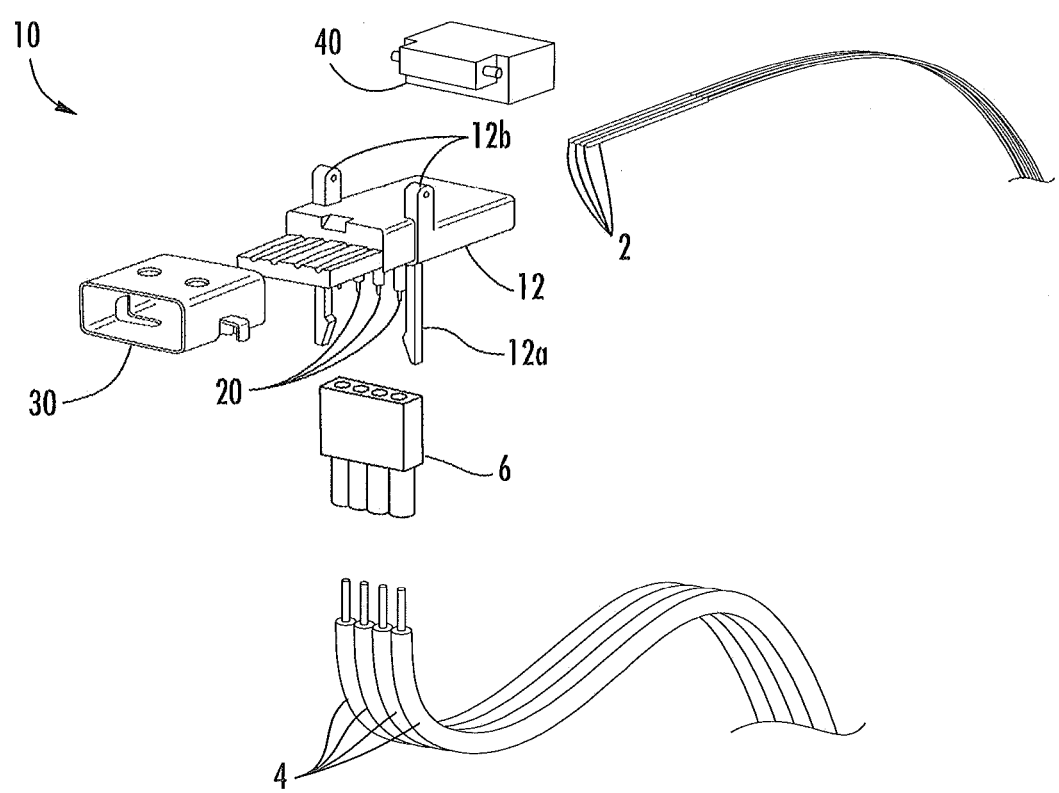
FIG. 1 is an exploded view of an explanatory hybrid mechanical splice fiber optic connector.

FIGS. 1-4 depict a first explanatory hybrid connector 10 having an electrical portion and a mechanical retention component. As used herein, a hybrid connector means that the assembly includes structure for securing optical waveguides such as optical fibers and making electrical connections. Specifically, FIG. 1 shows an exploded view of hybrid connector 10 along with suitable optical waveguides 2 and electrical conductors 4 such as an optical field fiber and a copper wire as may be terminated by the craft in the field. Hybrid connector 10 includes a body 12, at least one electrical contact 20, a shell 30, and a mechanical retention component 40 for securing for at least one field optical waveguide 2 such as a field optical fiber near the mating interface (not numbered) of the connector. The mechanical retention component of hybrid connector 10 may secure optical waveguides 2 at a position near an end face or lens or alternatively use a mechanical fiber optic splice with a stub fiber (not visible) to connect optical fiber 2 as discussed below.

As shown, hybrid connector 10 is shown as an USB style connector package, but other hybrid connector packages are possible with the concepts disclosed herein. In other words, hybrid connector 10 has alignment mating geometry that uses shell 30 for gross alignment and body 12 has a stepped portion (i.e., L-shaped portion) at the front end which is aligned with a complementary connector for connectivity. Simply stated, the stepped portion of body 12 is used for making both optical and electrical connections when engaging a complementary interface. By way of example, the electrical contacts 20 are presented at the horizontal surface of the L-shaped portion of body 12 and the optical connection is presented at the vertical surface of the L-shaped portion of body 12. However, the concepts disclosed herein can have other alignment mating geometry for securing the connection such as having a body with one or more keyway(s), an alignment opening, or a pin(s), or the like.

Figure 1A:
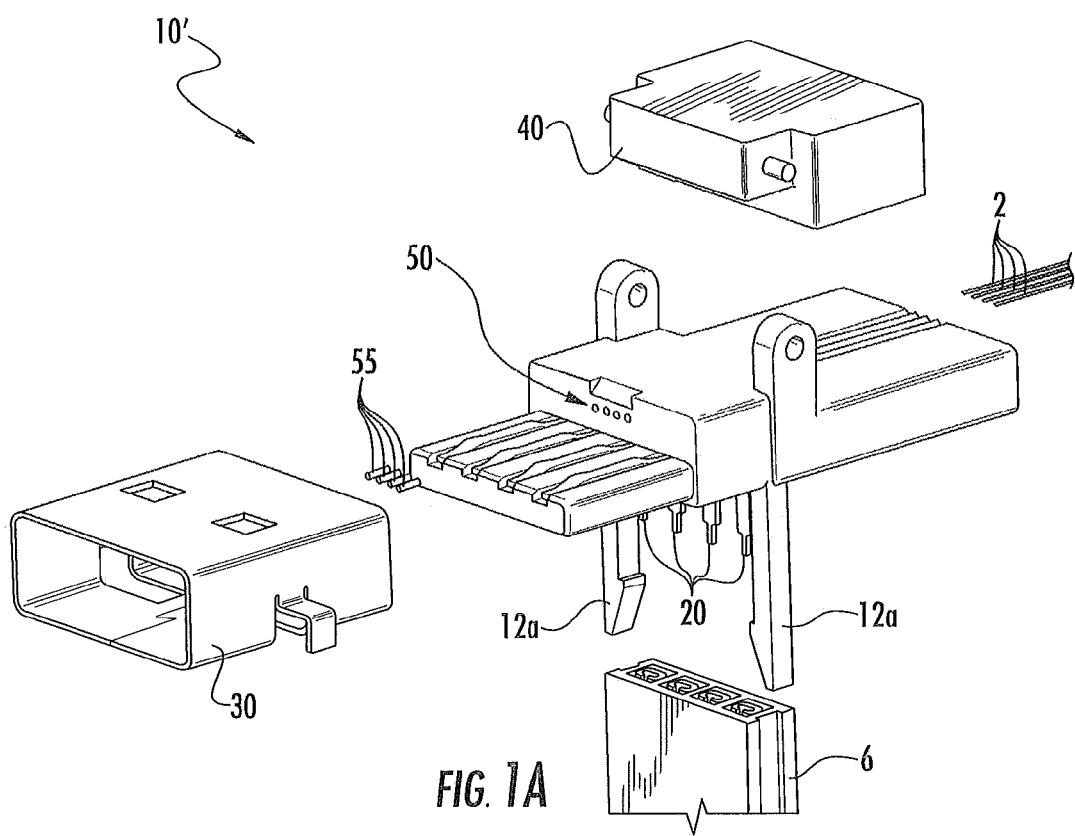
FIG. 1a is an exploded view of another explanatory hybrid mechanical splice fiber optic connector that is similar to FIG. 1, but includes lenses at the mating interface of the connector.
Figure 7B:
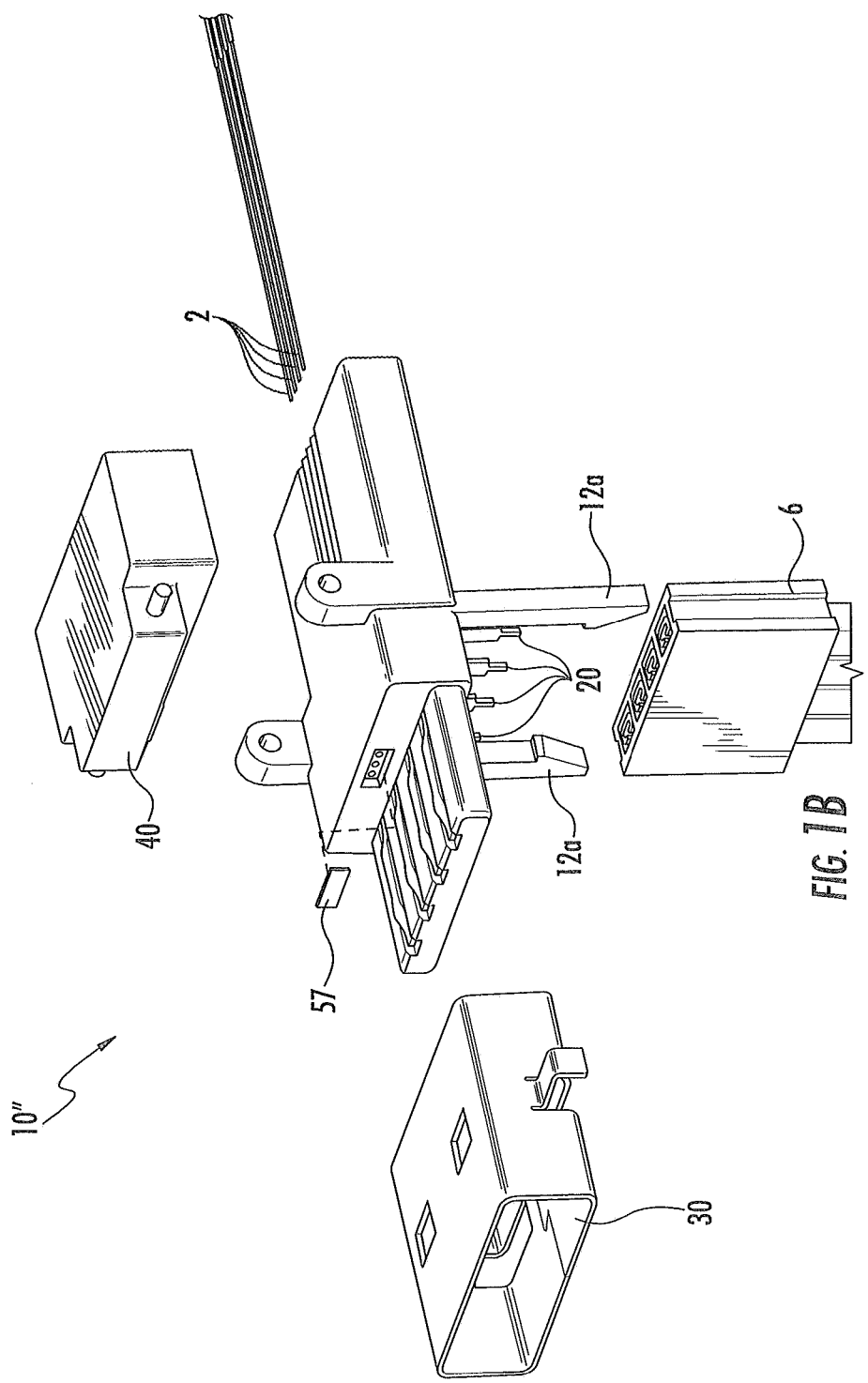
FIG. 7 is the hybrid mechanical splice fiber optic connector of FIG. 6 shown with a portion of the outer housing removed.
Figure 2:
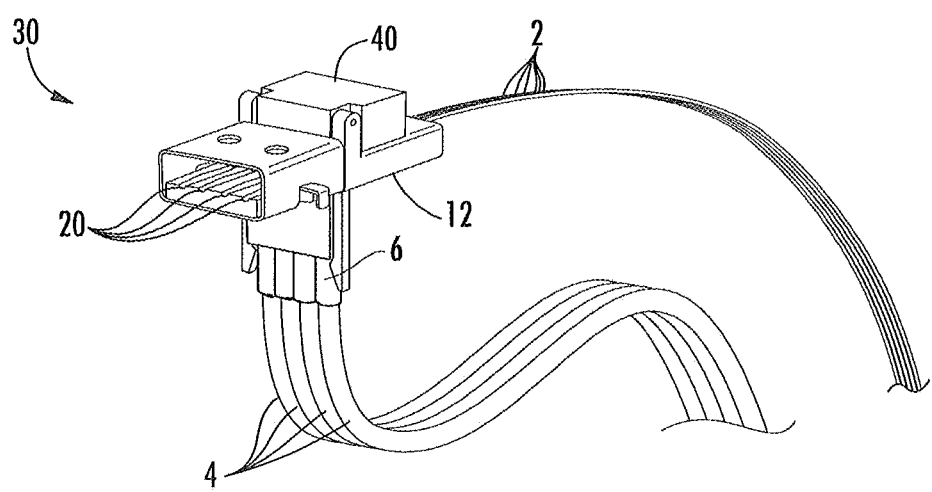
FIG. 2 is an assembled perspective view of the hybrid mechanical splice fiber optic connector of FIG. 1 shown with the electrical and optical wiring attached.

As will be discussed in greater detail later, other structures are possible for the mating interface of the hybrid mechanical splice connector. Illustratively, FIG. 1a is an exploded view of an explanatory hybrid mechanical splice fiber optic connector 10' that is similar to FIG. 1, having one or more lenses at the mating interface of the connector. Likewise, FIG. 1b is an exploded view of another explanatory hybrid mechanical splice fiber optic connector 10' that is similar to FIG. 1, having a cover at the mating interface of the connector FIG. 2 is an assembled perspective view showing the optical waveguides 2 and electrical conductors 4 attached to hybrid connector 10. Electrical conductors 4 are attached to respective electrical contacts of an electrical plug 6, but any other suitable electrical connector such as an insulation displacement contacts (IDC), crimp connection, or the like may be used with hybrid connectors. Electrical plug 6 is suitable for attaching to electrical contacts 20 of hybrid connector 10. Electrical contacts 20 may be formed with the body 12 or be discrete components that attach to body 12 attached by any suitable means. Generally speaking, the electrical portion enters on a first plane and the optical plane enters on a second plane and terminate in small durable footprint. In this embodiment, electrical contacts 20 are formed for changing directions (i.e., a 90 degree turn) so that electrical plug 6 can engage from below and the optical fibers 2 are directed in-line from the back of hybrid connector 10. However, any suitable angle is possible for the first and second planes of connectivity.

As shown, body 12 also includes optional attachment features 12a for securing the electrical plug 6 in position. Specifically, attachment features 12a are resilient arms with hooks on the end that snap about plug 6 for inhibiting unintended disconnection. At the mating interface, electrical contacts 20 are wiping contacts that are presented horizontally within shell 30; however, other types of electrical contacts may be suitable such pin contacts or the like. Body 12 also includes pivot arms 12b for pivotly securing mechanical retention component 40 to the same. Each pivot arm 12b includes a hole (not numbered) for capturing respective pins on the mechanical retention component 40; however, other pivot structures are possible such as using a separate pin.

Mechanical retention component 40 is used for securing at least one field optical waveguide 2 in the hybrid connector 10. Specifically, mechanical retention component 40 clamps optical waveguides 2 to body 12 in precise alignment for making an optical connection with a complimentary connector. Body 12 can have suitable grooves and/or bores along the optical axis for receiving and aligning optical waveguides 2 in the body during insertion from the rear or other components from the front or rear. For instance, the rear portion of the entry may have lead-in portions that are larger and taper to a smaller size for positioning the optical fibers in the desired array spacing at a connector end face 12e. Mechanical retention component 40 can have any suitable surface for clamping optical waveguides 2 to body 12. For instance, mechanical retention component 40 can have a generally flat clamping surface or the clamping surface may have grooves for conforming/aligning portions of optical waveguides 2. Further, the clamping surface may be either a rigid surface or a slightly compliant surface to inhibit optical waveguide movement when in the clamping position. Mechanical retention components may also include a lever or other structure for gripping and/or increasing the mechanical force for actuation. Moreover, the mechanical retention component 40 may only clamp a small portion such as a rearward portion of the inserted field fibers.

Mechanical retention component 40 may secure optical waveguides 2 at a position near an end face using any suitable structure as discussed. Further, mechanical retention component 40 may toggle between a clamp position that secures the field optical waveguides and an open position for inserting the field optical waveguides into hybrid connector 10. The clamping position of mechanical retention component 40 secures the optical waveguides with enough force so they do not move without causing damage to the same. In this embodiment, mechanical retention component 40 is non-destructible and reversible so that in the event re-termination is necessary it can be completed by simply moving component 40 to the open position. The mechanical retention component 40 and/or body 12 may include geometry for toggling the same, which can have a positive lock, a friction-fit, or other suitable mechanical structure. In this embodiment, mechanical retention component 40 is a clamp that rotates for securing a field fiber that is inserted into hybrid connector 10 by the craft in the field that secured by a friction fit. However, a locking structure either reversible or not may be included on the mechanical retention component 40 and/or body 12 for maintaining the field fibers in the secured position. By way of non-limiting example, the mechanical retention component 40 may include a latching arm that engages an aperture or recess in body 12 for securing a clamping position.

Further, the mechanical retention component may secure (i.e., clamp or hold) a portion of at least one bare field optical fiber and/or a buffer portion of the at least one field optical fiber. Although, mechanical retention component 40 component rotates about an axis for securing the at least one field optical fiber other structures and/or mechanisms are possible. By way of example, the mechanical retention component may be a clamp, a wedge or ramp, a linear actuator having a push-button activation, a slide, a rotating cam, or the like. Additionally, the mechanical retention component can secure the field optical fiber at one or more locations along the length of the field optical fiber using the same or a second component or structure.

Likewise, hybrid connectors disclosed herein can have one of several different designs for transmitting a light signals across the connector interface. By way of example, mechanical retention component 40 may secure field optical waveguide 2 near the connector end face of the body 12. Examples of securing the optical waveguides near the connector end face with a mechanical retention component 40 include positioning them generally flush with a mating end face of the connector as shown or having the optical waveguide adjacent to a lens near the mating end face of the body. Alternatively, the mechanical retention component may secure the field optical waveguide 2 in abutment with an end of a stub fiber or lens, thereby making a mechanical optical splice.

Figure 3:
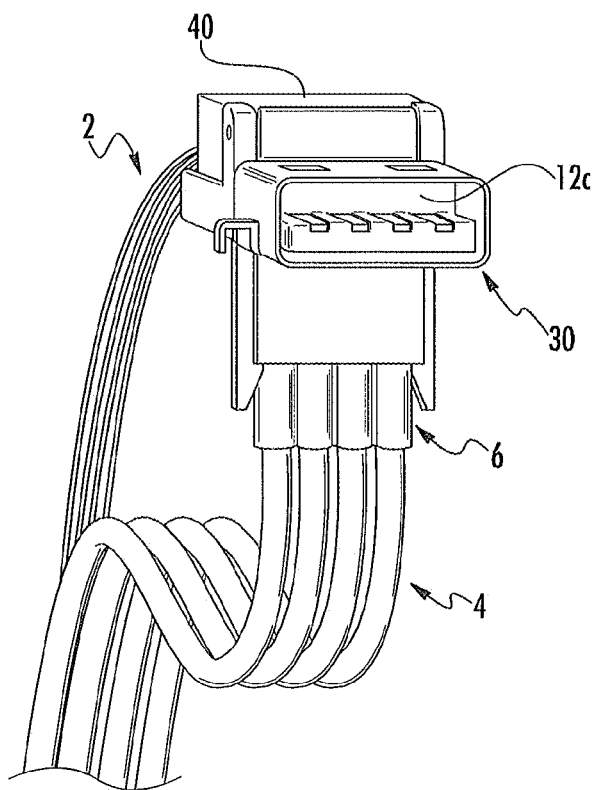
FIGS. 3 and 4 respectively are front and rear perspective views of the hybrid mechanical splice fiber optic connector of FIG. 2.
Figure 4:
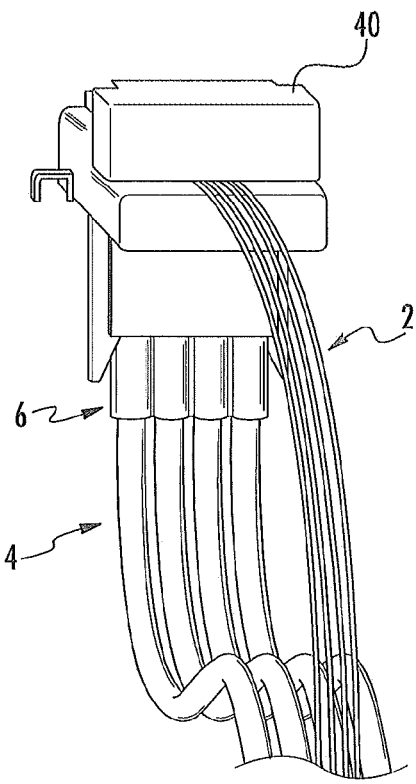

FIGS. 3 and 4 respectively are front and rear perspective views of the hybrid connector 10. Specifically, FIG. 3 is a view into the shell 30 showing the optical connector end face 12e and the electrical contacts 20. Shell 30 is generally disposed about the front of body 12 and aids in gross alignment with a complimentary hybrid connector. Shell 30 is secured to body 12 in a suitable manner such as by snap-fitting and/or being crimped into the same.

FIG. 1a depicts hybrid mechanical splice connector 10' similar to connector 10 that further includes at least one optically transmissive component near a mating interface 50 for guiding the optical signals therethrough. In the illustrated embodiment, the mating interface 50 includes four lens components 55 configured to expand or focus the optical signals received from the field optical waveguide 2 attached to the connector. In other words, the lens components 55 may enhance optical coupling with the mated complementary optical coupling. By way of example, the lens components may be graded refractive-index lenses; however, other suitable lenses are possible. The bores of body 12 can have a larger diameter for receiving the lens components 55 compared with the portion of the bore that receives the field optical waveguide. More or fewer lens components may be provided as the number of lens components may depend on the number of optical fibers (and therefore, optical channels) the connector can terminate. In other embodiments, the lens components 55 may be integrally formed with the body 12 as a single component that may or may not include an optically transmissive cover.

Other options designs include placing an optically transmissive cover in front of the lenses for protecting the same and providing surface that is easy to clean. FIG. 1b shows another explanatory hybrid mechanical splice fiber optic connector 10" that is similar to connector 10', but includes an optically transmissive cover 57 at the mating interface of the connector. The optically transmissive cover 55 may include integral lens components for aiding in coupling the optical signals into and out of the field optical waveguides 2. In other embodiments, the cover merely provides a flat cleanable surface and does not include lenses or the lenses could be individual components behind the cover 57 as desired. Still further variations are possible such as integrating the lens components 55 with the optically transmissive cover as one component.

Embodiments where the field optical waveguide 2 is in abutment with and end of a stub fiber, lens or mechanically spliced with another optically transmissive component for making an optical bridge may also use other techniques and/or structure for improving performance, validating the splice, or other functions. For instance, an index matching substance such as an index matching gel may be used for improving the optical coupling at the splice and reducing optical losses. The end of stub fiber or lens may also be shaped for aiding optical coupling.

Further, any one of the mechanical splice connectors disclosed may have one or more translucent components disposed about the mechanical splice inside the connector for observing the glow to determine if an excessive amount of light is leaking from the mechanical splice. By way of example, the mechanical splice connectors 10' or 10" may have one or more components with a translucent portion such as at least one of the body or the mechanical retention component having a translucent portion. Moreover, the shell or other components of the connectors disclosed may have one or more windows for observing whether an excessive amount of light is leaking from the mechanical splice by viewing the brightness of the translucent portion near the mechanical splice.

Figure 5:
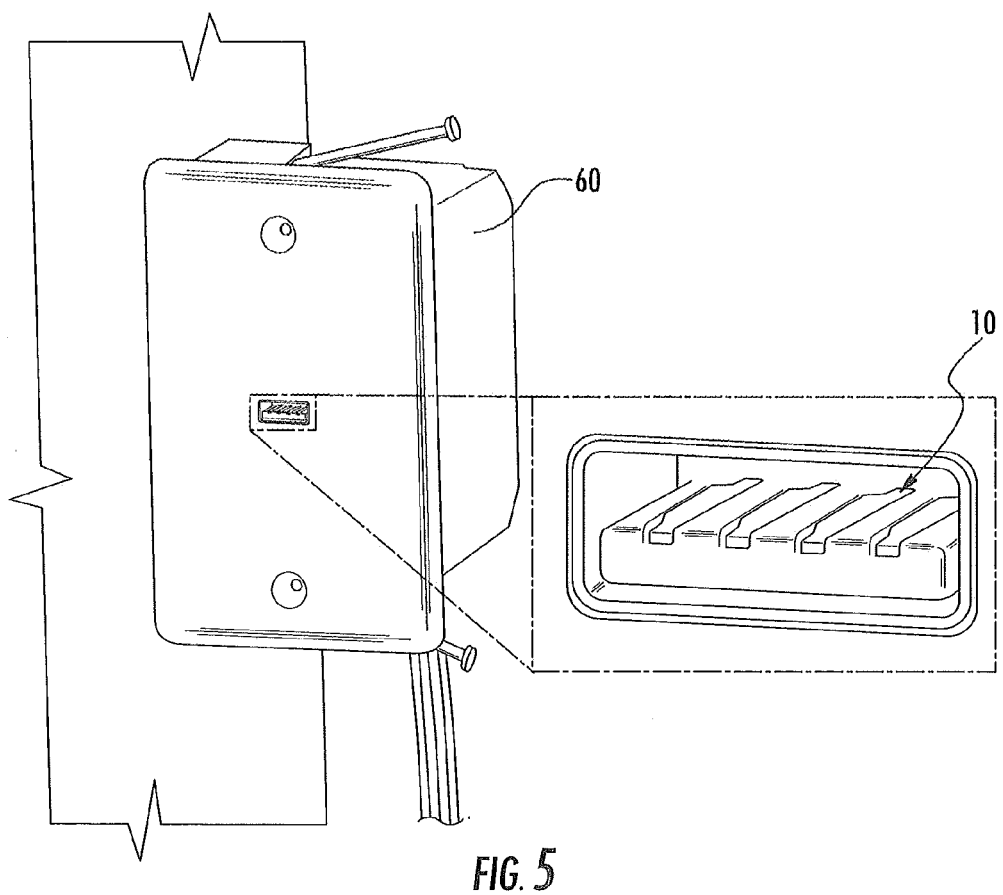
FIG. 5 depicts the hybrid mechanical splice fiber optic connector of FIG. 2 disposed within a mounting box.
Figure 5A:
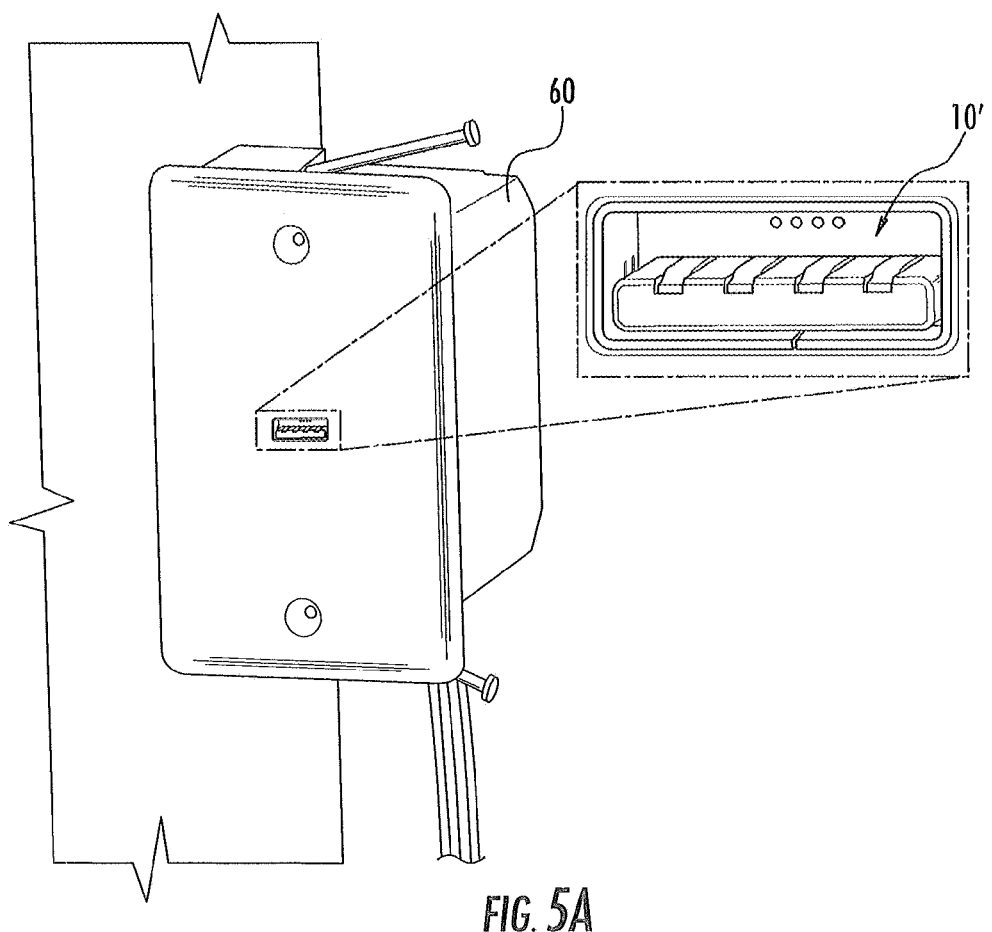
FIG. 5a depicts the hybrid mechanical splice fiber optic connector of FIG. 1a disposed within a mounting box.

FIG. 5 depicts the hybrid connector 10 mounted in a box 60 as a receptacle. In this configuration, hybrid connector 10 is mounted to a frame other structure that is attached to box 60. In other configurations, hybrid connector can be modified to mount to a circuit board by snap-fitting, mechanical fasteners, solder pads, or the like. Hybrid connector 10 functions as one-half of the hybrid connection; however, the concepts disclosed herein may be suitable for either the half (e.g., the receptacle or the plug ends) of connection. Moreover, the hybrid connectors may connect any suitable number of electrical and/or optical waveguides. Likewise, FIG. 5a depicts the hybrid mechanical splice fiber optic connector 10' disposed within box 60 in a similar fashion as hybrid connector 10. Hybrid mechanical splice connector 10" may be disposed in box 60 if desired.

Figure 6:
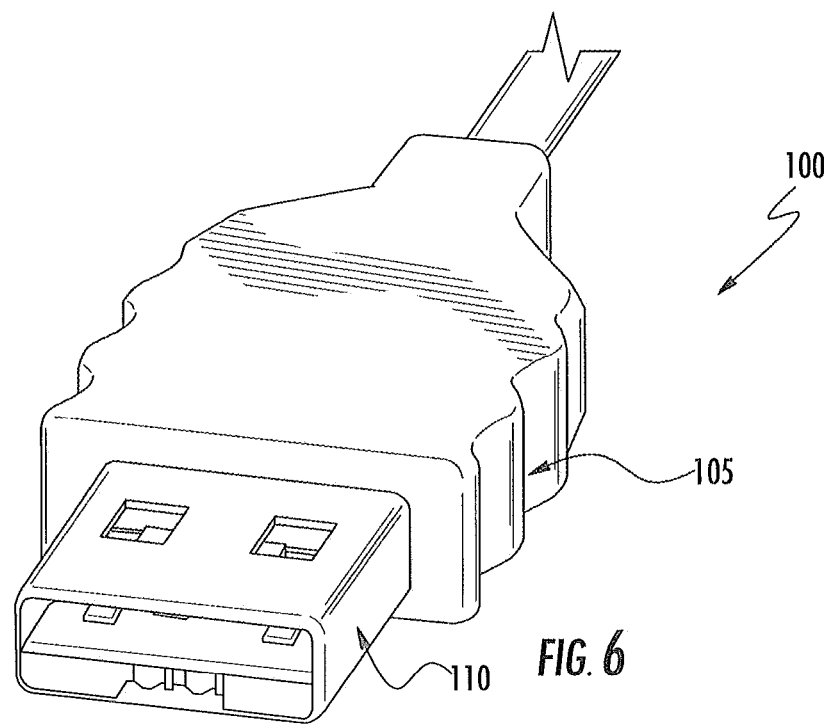
FIG. 6 depicts another explanatory hybrid mechanical splice fiber optic connector.
Figure 7:
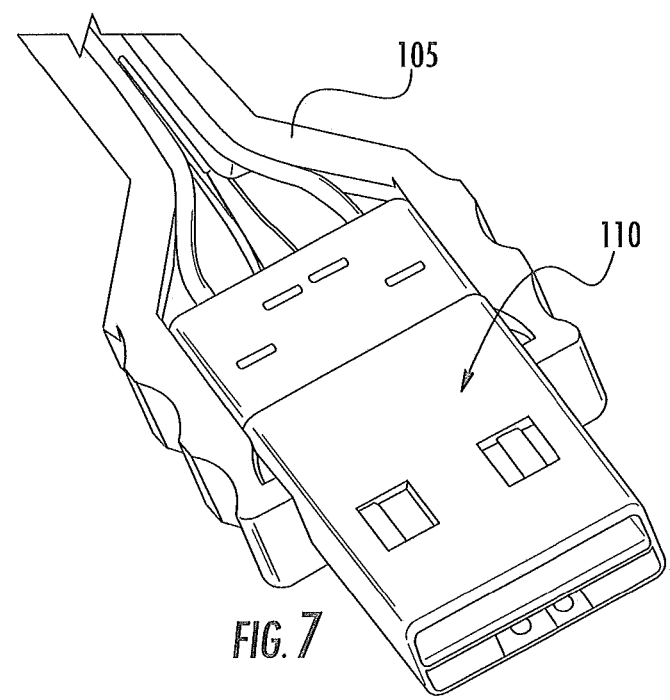

Illustratively, FIGS. 6-11 depict another explanatory hybrid connector 100 configured as a plug for mating with the hybrid connector 10. FIGS. 6 and 7 respectively show a perspective view of hybrid connector 100 showing the mating end of the same and the connector with a portion of housing 105 removed to view routing of field optical waveguides 2 and electrical conductors 4 to a shell assembly 110. Shell assembly 110 is removable from the housing and the optical waveguides, electrical connectors, strength members, and/or cable jacket can have any suitable strain relief. Hybrid connector 100 is suitable connector for mating with hybrid connector 10 for making both electrical and optical connections in a quick, easy and reliable manner. However, hybrid connector 100 uses a mechanical splice between the field optical fibers and one or more optical fibers stubs of the connector.

FIG. 8 shows the shell assembly 110 of hybrid connector 100 removed from housing 105 and showing a pair of actuators 142 for activating mechanical retention components that secure field optical fibers 2. As shown, shell 130 is formed about the internal components hybrid connector so that appropriate windows and openings align about respective structure as shown. By way of explanation, shell 130 is made of a conductive material such as stamped metal for providing strength and it may optionally provide an electrical ground reference. As shown, shell 130 is formed and at least partially secured using an interlocking seam (not numbered) along a longitudinal axis thereof. Moreover, shell 130 may have one or more windows or openings (not numbered) that align about structure of body 112 for alignment purposes and/or inhibiting relative movement between the same. As shown, actuators 142 extend through windows in shell 130 and the windows are large enough for allowing the actuators to move between an open position and a secure position. The windows for actuators 142 can also serve other functions such as acting as a viewing window for observing the glow of the splice loss of the mechanical splice if translucent components are used about the splice.

Figure 18:
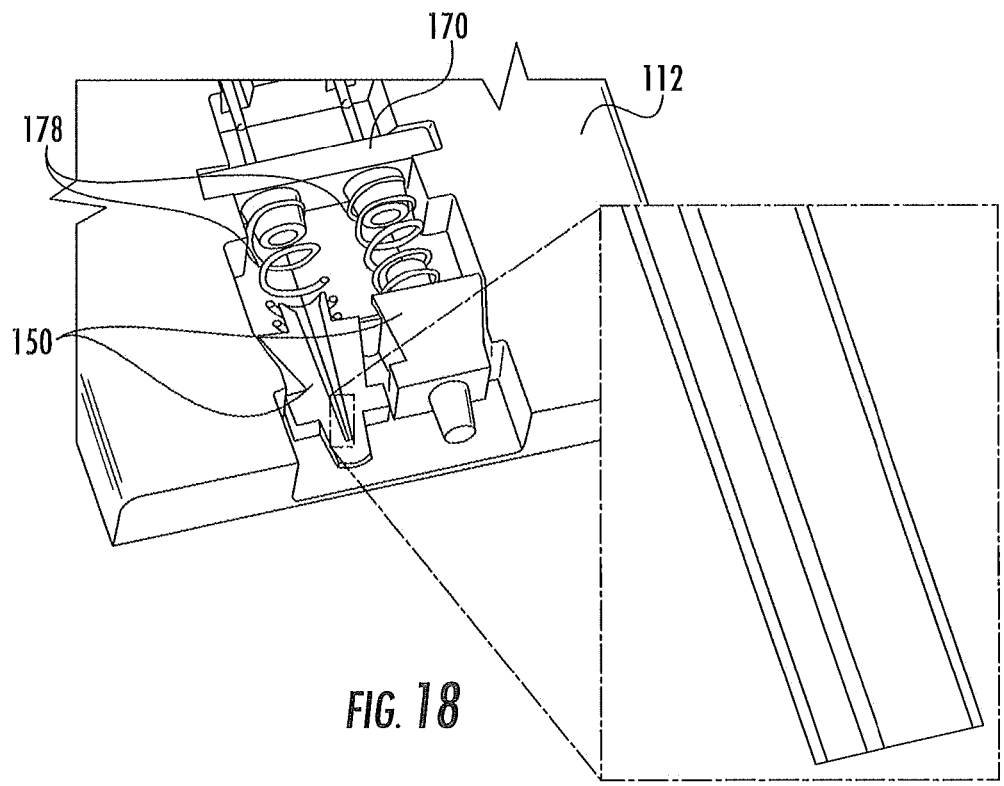

FIG. 9 is a perspective view showing shell 130 removed, thereby showing the assembly details of lens elements and the mechanical fiber splice region. As shown, body 112 has several cavities for receiving and securing components of hybrid connector 100. Starting at the mating end, the assembly shown in FIG. 9 includes at least one lens 150 and in this embodiment individual lens or lens elements for each field optical fiber. As best shown in FIG. 18, the optical coupling between the field optical fiber and the lens is made within a bore (not numbered) of the lens 150. In other words, the field fiber enters a rear portion of component 150 and abuts the lens portion of the same. As with other connector components disclosed, the lens may have a translucent portion for determining if excess light was leaking at the mechanical splice between the fiber and lens. As shown, the lenses 150 are biased to a forward position using individual coil springs 178 for each lens. Springs 178 are biased from a spring push 170 that is received in retention slots in formed in body 112. Additionally, spring push 170 has openings for threading the optical fiber stubs 160 therethrough and into respective mechanical splice assemblies located rearward. Hybrid connector 100 is an explanatory connector showing concepts of the connector, but it may have many variations. For instance, similar hybrid connectors may use a single lens or having different types of mechanical splice assemblies and/or mechanical splice components as discussed herein.

FIG. 10 is an exploded view of hybrid connector 100 showing the housing 105, the body 112, one or more electrical contacts 120, an electrical connection 126, shell 130, a set of mechanical retention components 140, two individual lenses 150, optical fiber stubs 160, spring push 170, and one or more springs 178. Hybrid connector 100 has a set of mechanical splice assemblies (not numbered) that are partially shown in the bubble detail that includes mechanical retention components 140, actuators 142, and one or more optical fiber stubs 160 for making individual mechanical splices with field optical waveguides 2. In other words, first ends of the optical fiber stubs 160 are abutted with respective field optical waveguides 2 within the respective mechanical splice assembly. However, other embodiments may secure a plurality of field optical fibers using a single mechanical splice assembly instead of using individual mechanical splice assemblies for each field optical fiber. Lenses 150 are typically beam expanding lenses for focusing and/or increasing the area of illumination, thereby making alignment and signal transmission easier.

Figure 11:
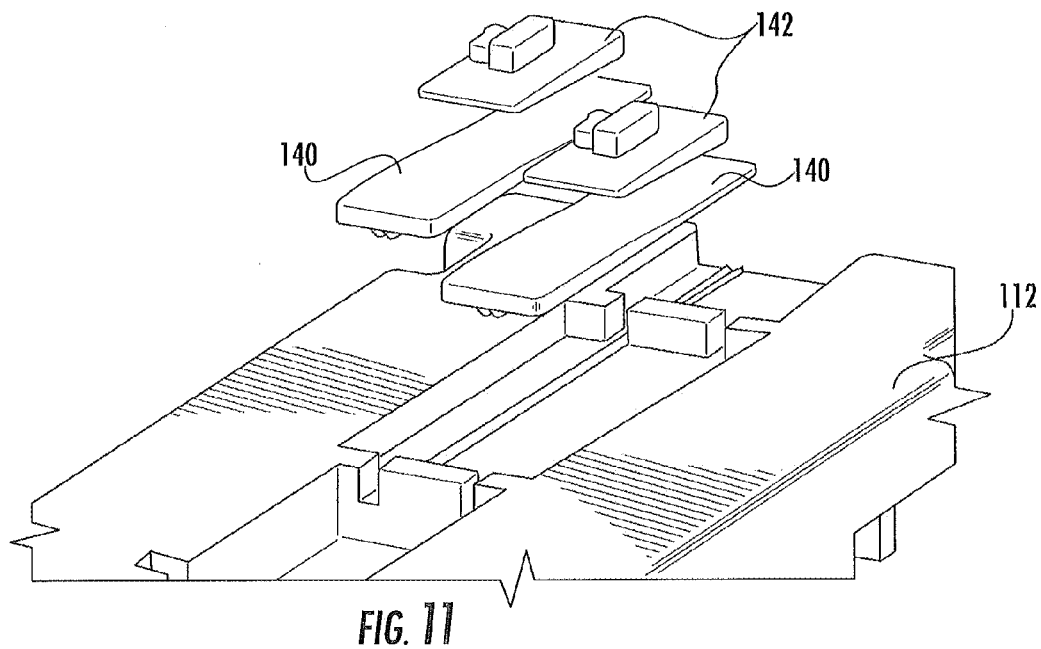
FIG. 11 is a detailed perspective exploded view of the explanatory mechanical optical splice assembly of FIG. 10.

FIG. 11 is a detailed perspective exploded view of the explanatory mechanical optical splice assembly of hybrid connector 100. As shown, the body 112 and/or mechanical retention component 140 has a plurality of fiber alignment features and grooves (not numbered) for receiving and aligning the optical fiber stubs 160 with field optical fibers 2 within the splice area. Specifically, mechanical retention components 140 are ramps that move from an open position to a secure position using actuators 142 that move in a linear fashion that is generally in the longitudinal direction in-line with the optical fibers. In other words, when a respective actuator 142 is disposed in a rearward position with respect to the ramp feature of the mechanical retention component 140 the assembly is in an open position so that field optical fibers 2 may be inserted into the mechanical splice assembly for abutting alignment with the stub optical fiber 160. Thereafter, moving the actuator 142 to a forward position with respect to the ramp feature of mechanical retention component 140 causes the component to move to a secure position, thereby clamping the field optical fiber 2 within the mechanical splice assembly. Additionally, hybrid connectors making a mechanical splice between optical fibers, lenses, or the like may optionally include an index-matching gel for reducing the splice loss.

Figure 12:
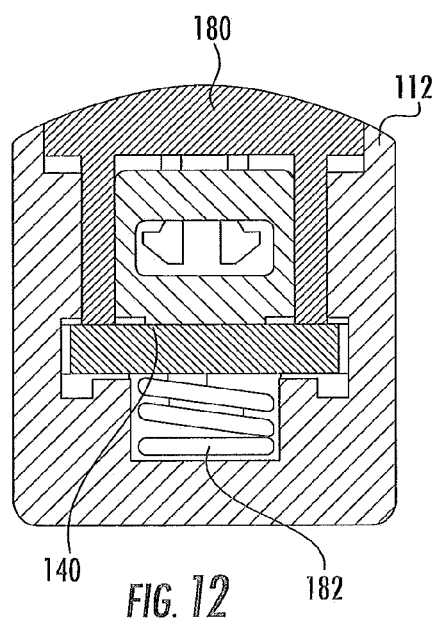
FIG. 12 shows an alternative mechanical splice assembly for use with hybrid connectors.

Of course, other suitable structures and/or components are possible for making a mechanical splice between optical fiber stubs 160 and field optical fibers 2. Illustratively, FIG. 12 depicts a push button actuator for making the mechanical splice between both optical fiber stubs 160 and field optical fibers 2 simultaneously instead of individually. In this embodiment, the mechanical retention component 140 secures both stub optical fibers and field optical fibers in abutting alignment by clamping the same. In particular, the stub optical fiber and field optical fibers are disposed between a lower portion and an upper portion and the mechanical splice assembly is actuated using activator 180 such as a push button. Moreover, the lower portion may be biased into position and inhibit excess crushing forces using a spring 182.

Figure 13:
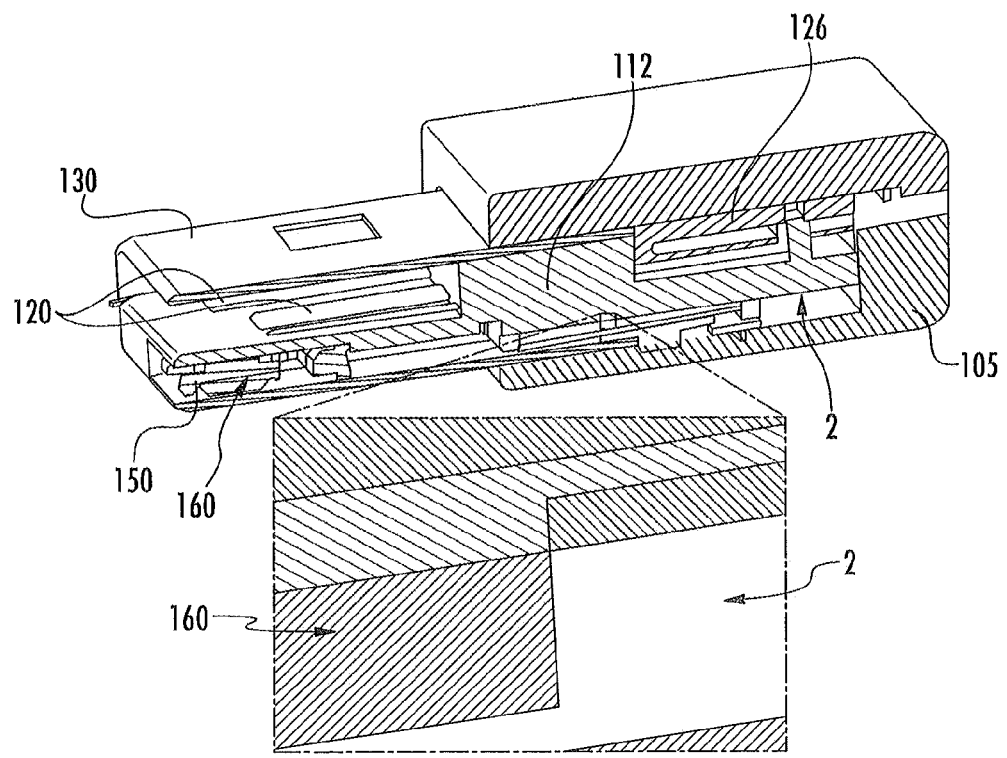
FIG. 13 is a cross-sectional view of the explanatory the hybrid connector of FIG. 6.
Figure 14:
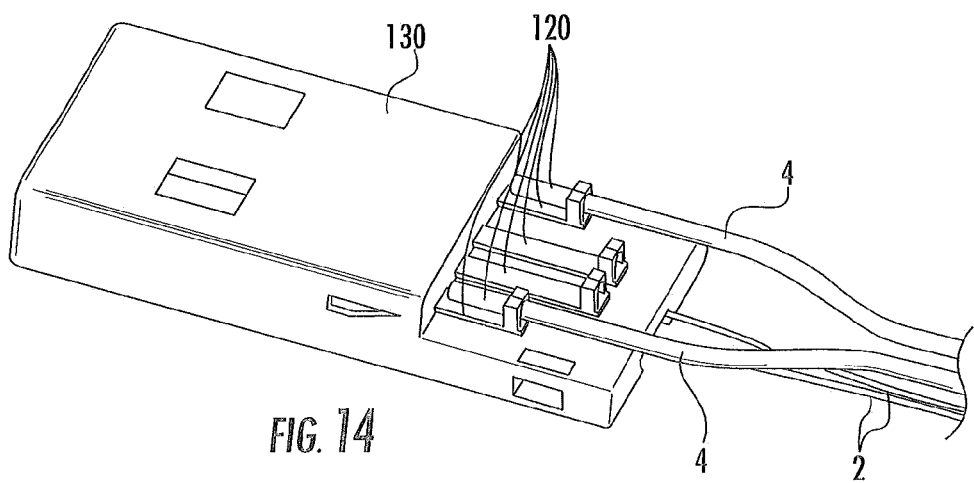
FIG. 14 is a perspective view showing a portion of the electrical connection for the hybrid connector.
Figure 15:
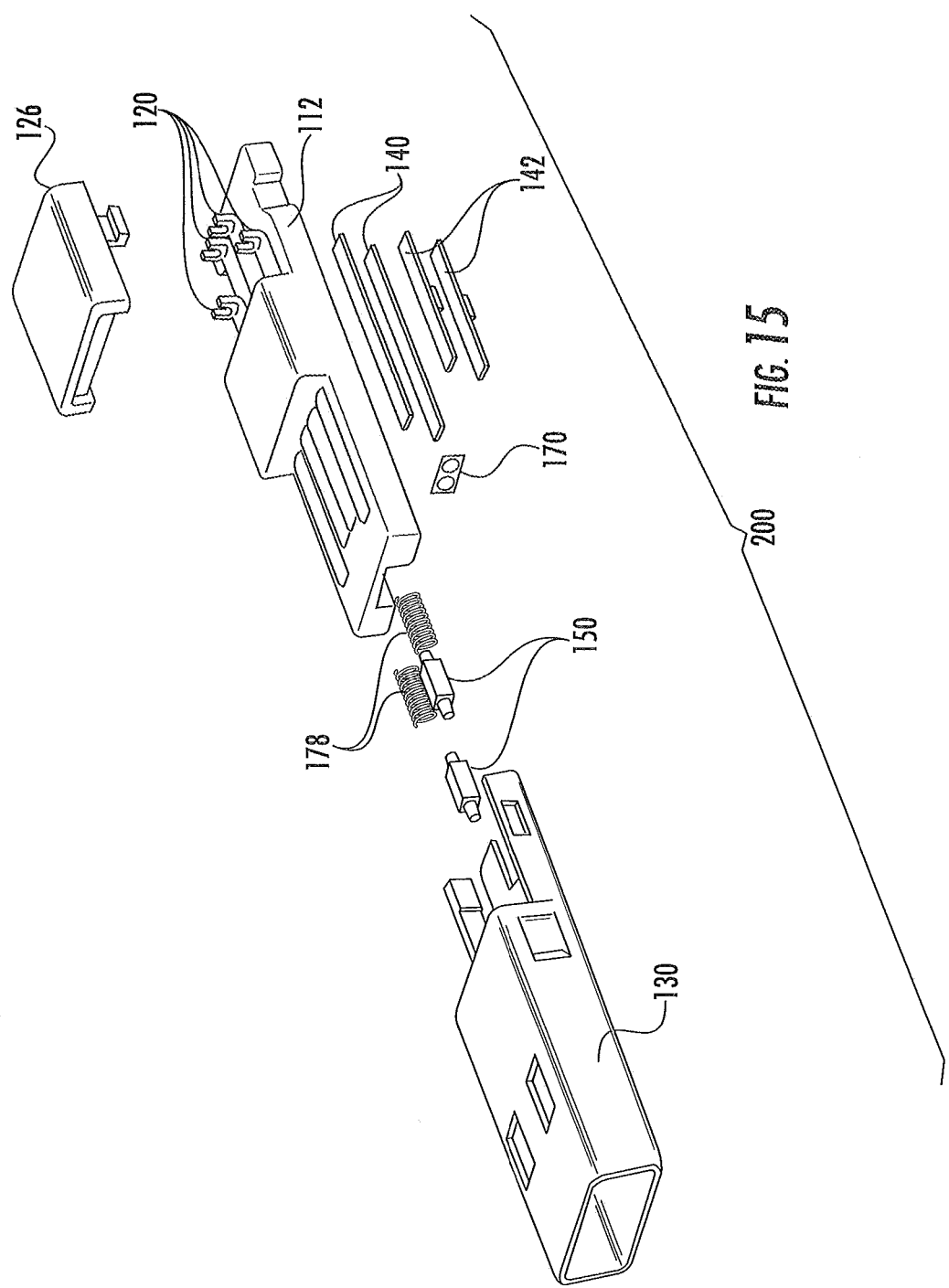
FIGS. 15-19 depict another explanatory hybrid fiber optic connector using one or more lenses.

FIG. 13 is a cross-sectional view of hybrid connector 100 showing the assembly details along with the mechanical splice between stub optical fiber 160 and field optical fiber 2. Additionally, hybrid connector 100 uses electrical connection 126 for making and securing an electrical connection between respective electrical contacts 120 and electrical conductors 4. Specifically, electrical connection 126 is an insulation displacement (IDC) connection that snap-fits to a closed position, thereby pushing electrical conductors 4 onto the insulation displacement structure of the electrical contacts 120 which cuts through the insulation of electrical conductors to make electrical contact. As best shown in FIG. 8, electrical connection 126 includes one or more tabs that engage windows of shell 130 for securing the same. Consequently, the electrical connections may be made in a quick and reliable manner by the craft. Other electrical connections are also possible. FIG. 14 depicts the rearward portion of electrical contacts 120 and the electrical conductors 4 attached thereto. Additionally, hybrid connector 100 includes four electrical contacts 120 so it can be configured to be backwards compatible with USB 2.0 if so desired.

Figure 16:
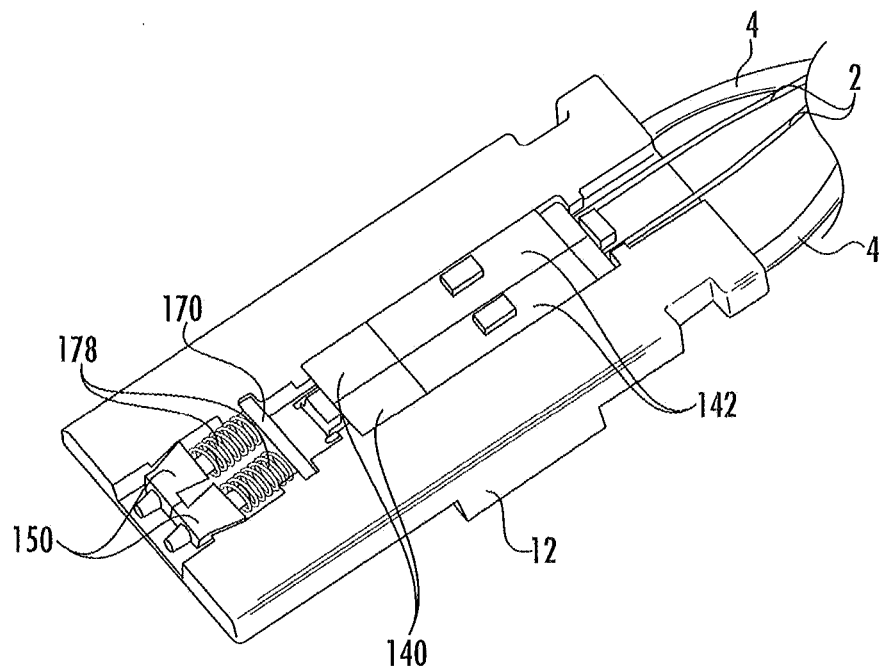
Figure 17:
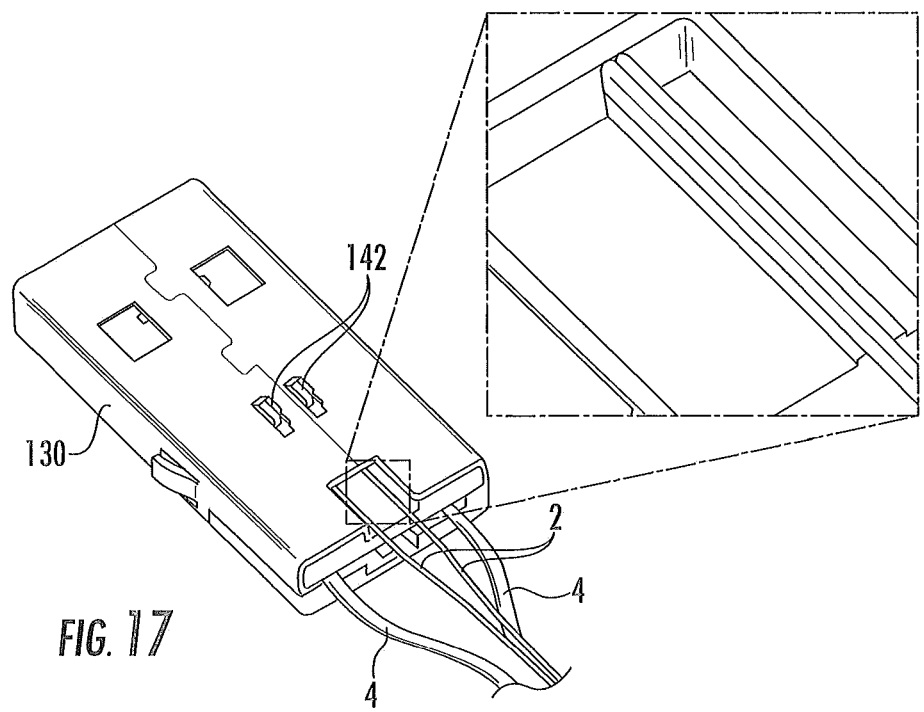

FIGS. 15-19 depict another explanatory hybrid connector 200 for making electrical and optical connections that is similar to hybrid connector 100 except that it does not include stub optical fibers like hybrid connector 100. Instead, hybrid connector 200 allows insertion of the field optical fibers 2 into the body 112 until they are abutting and/or adjacent to lenses 150 before securing the same. Mechanical retention components 140 and actuators 142 of hybrid connector 200 operate in a manner similar to hybrid connector 100; however, the mechanical retention components 140 and actuators 142 are slightly longer than in hybrid connector 100 as best shown in FIG. 16. FIG. 17 shows a perspective view with shell 130 attached to form the sub-assembly along with the lead-in detail shown in the detail bubble.

Figure 19:
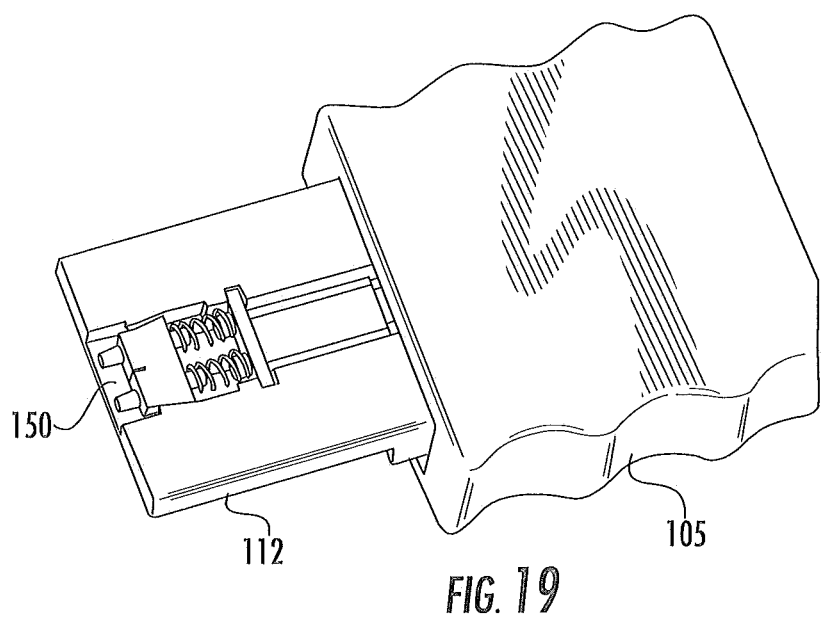

FIG. 18 shows a detailed view of the lens arrangement and detail of hybrid connector 200. Specifically, lenses 150 include a "blind" bore (not numbered) for aligning and centering the field optical fiber 2 at the rear portion of the lens 150. As shown in the detail bubble, the bore of the lens can include one or more centering ribs or other structure for centering the field optical fiber therein and/or help maintain a predetermined longitudinal position with respect to the lens. Additionally, the lens 150 may have an index matching gel disposed therein and the centering ribs allow for the gel to be displaced as the field optical fiber is seated in the lens 150. Still other variations are possible with hybrid connectors disclosed herein. For instance, FIG. 19 depicts a hybrid connector having a single lens 150 for multiple field optical fibers. Moreover, lens 150 may also function as alignment mating geometry since the front end may use as a pin-like structure for aligning the lens front face with a complementary connector.

Figure 20:
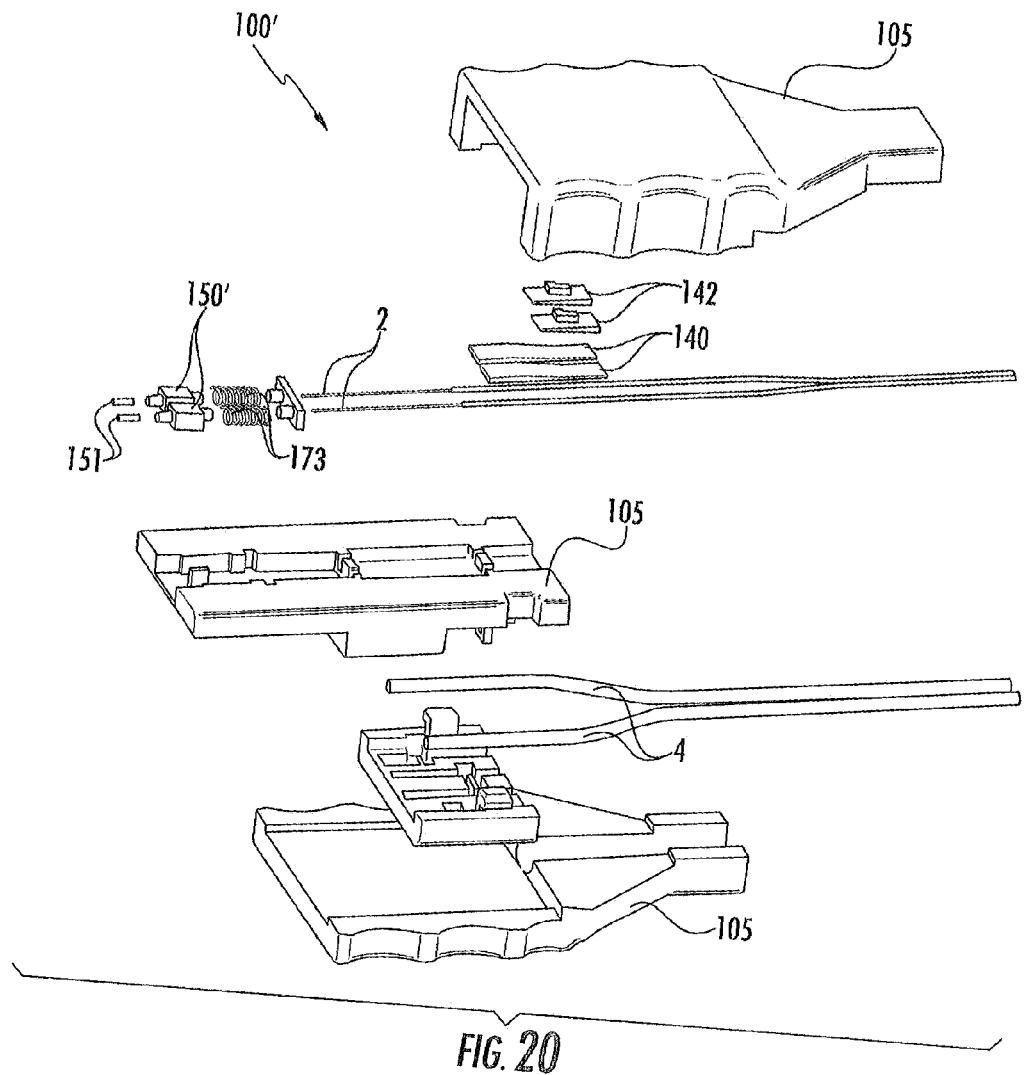
FIG. 20 is an exploded view of an another explanatory hybrid mechanical splice fiber optic connector that is similar to connector of FIGS. 15-19, but includes a discrete lens component at the mating interface of the connector.
Figure 21:
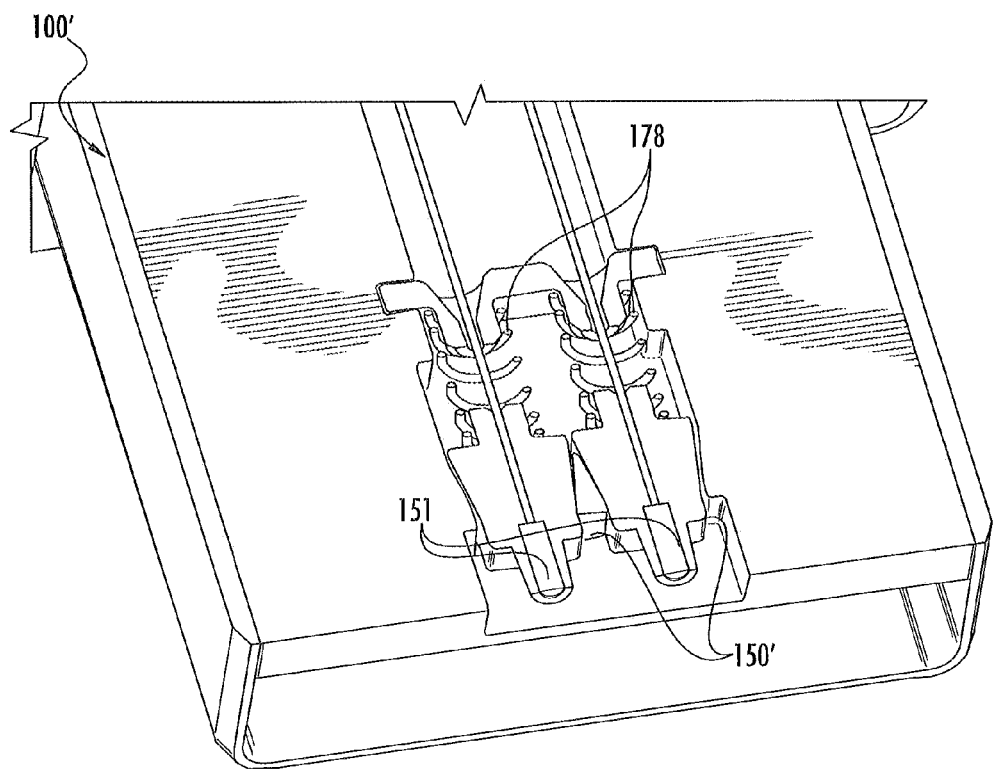
FIG. 21 is an enlarged cross-sectional view showing a portion of the construction for the connector of FIG. 20.

FIG. 20 is an exploded view of an another explanatory hybrid mechanical splice fiber optic connector 100' that is similar to connector 200 of FIGS. 15-19, but includes a discrete lens component 151 secured in body 150', thereby forming the mating interface of the connector. The discrete lens component 151 also acts as a body for making a mechanical splice between the field fiber and the lens. FIG. 21 is an enlarged cross-sectional view showing a portion of the construction for connector 100'. Lens component 151 may be any suitable lens such as a collimating lens like a GRIN element, refractive or diffractive lens. Unlike a conventional lens, the GRIN element may have a planar surface that is flat or angled as desired. The bore of component 150' can include a stepped profile so as to seat the lens at the front of the component 150'. As with other embodiments, one or more components of connector 100' may have a translucent portion for observing whether excess light is leaking from the mechanical splice.

Figure 22:
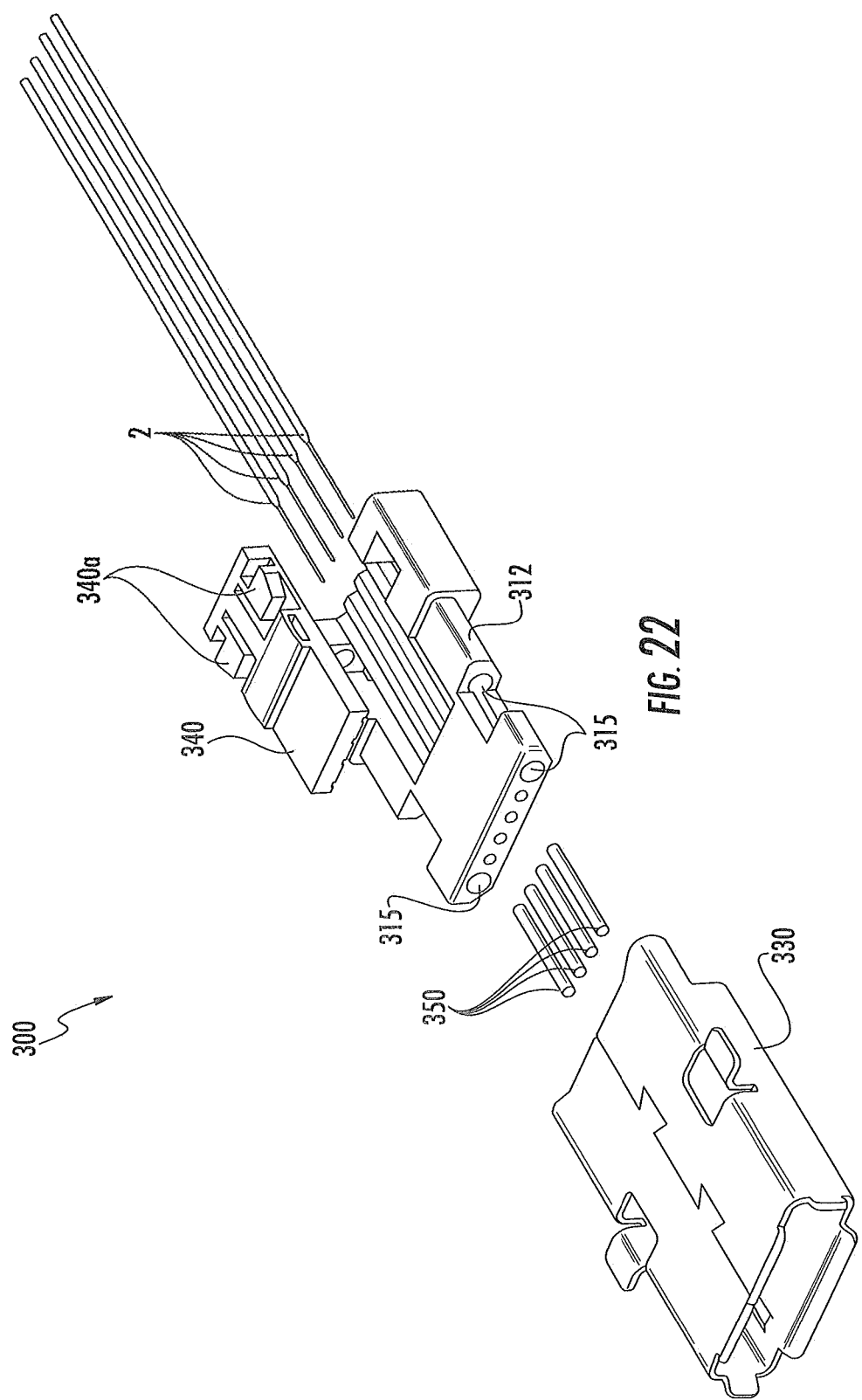
FIG. 22 is an exploded view of an explanatory all optical mechanical splice fiber optic connector that includes lens elements.
Figure 23:
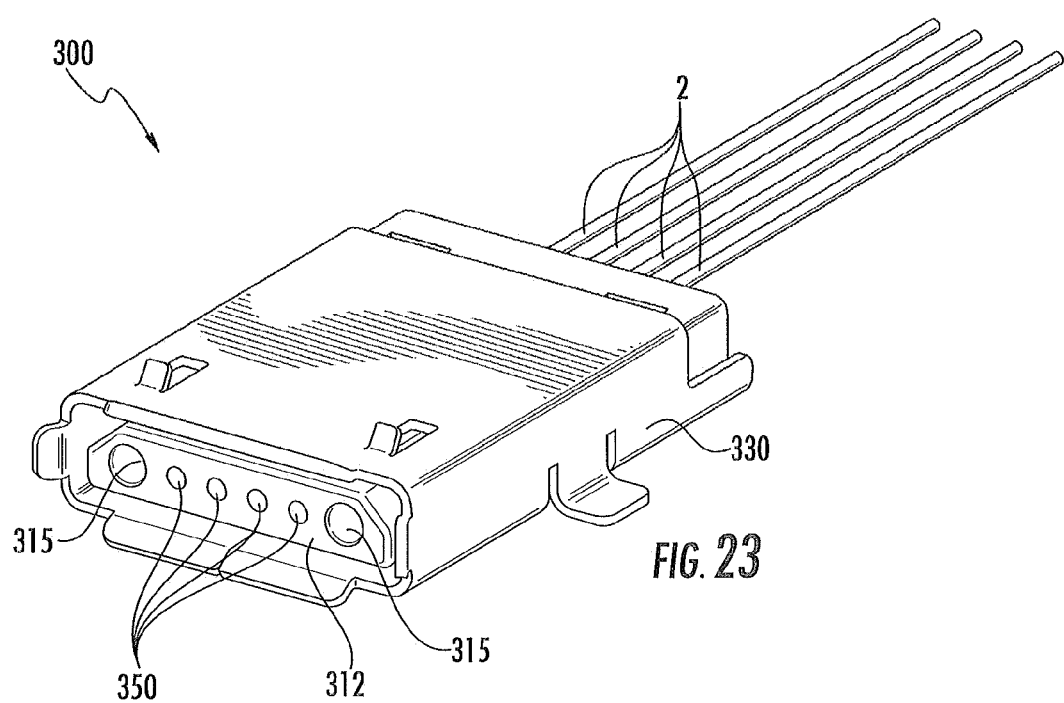
FIG. 23 is an assembled perspective view of the optical mechanical splice fiber optic connector of FIG. 22 shown with the optical wiring attached.

Still other variations are possible according to the concepts disclosed. FIGS. 22 and 23 respectively depict an exploded view and assembled perspective view of an explanatory optical mechanical splice fiber optic connector 300 that only has optical connectivity. As shown, mechanical splice fiber optic connector includes a body 312 having a plurality of grooves 312a or the like for receiving field optical waveguides 2 and acting as guides for insertion of the optical waveguides. Connector 300 also includes a shell 330 and a mechanical retention component 340. Body 312 can receive field optical waveguides 2 at the mating interface of body 312 (i.e., front side) or have one or more lenses at the mating interface as desired. As depicted in FIG. 22, body 312 receives one or more discrete lens elements 350 in the respective bores of the body 312, but the lens elements could be integrated (i.e., molded) into the body 312 providing a single part, thereby requiring fewer assembly steps. Additionally, this embodiment includes a mechanical retention component 340 that also acts as the actuator for securing the optical waveguides. The mechanical retention component 340 can be sized for receiving and retaining bare optical waveguides and/or buffered optical waveguides as desired.

In other words, actuation of mechanical retention component 340 secures the optical waveguides within the connector 300 without having further structure (i.e., other components), but other embodiments may include a separate actuator or further structure if desired. Mechanical retention component 340 moves with respect to body 312 for securing the optical waveguides 2 to connector 300 and includes one or more locking features 340a such as latching arms for securing the same with the body 312 as shown below in FIGS. 25-27. The portion of mechanical retention component 340 that secures the field optical waveguides 2 can include one or more grooves or simply be a planar surface as desired. Additionally, any of the mechanical splice connectors disclosed herein can optionally include a suitable crimp for securing the field optical waveguides and inhibiting pull-out forces on the waveguides from moving the same with respect to the mechanical retention component.

Figure 24:
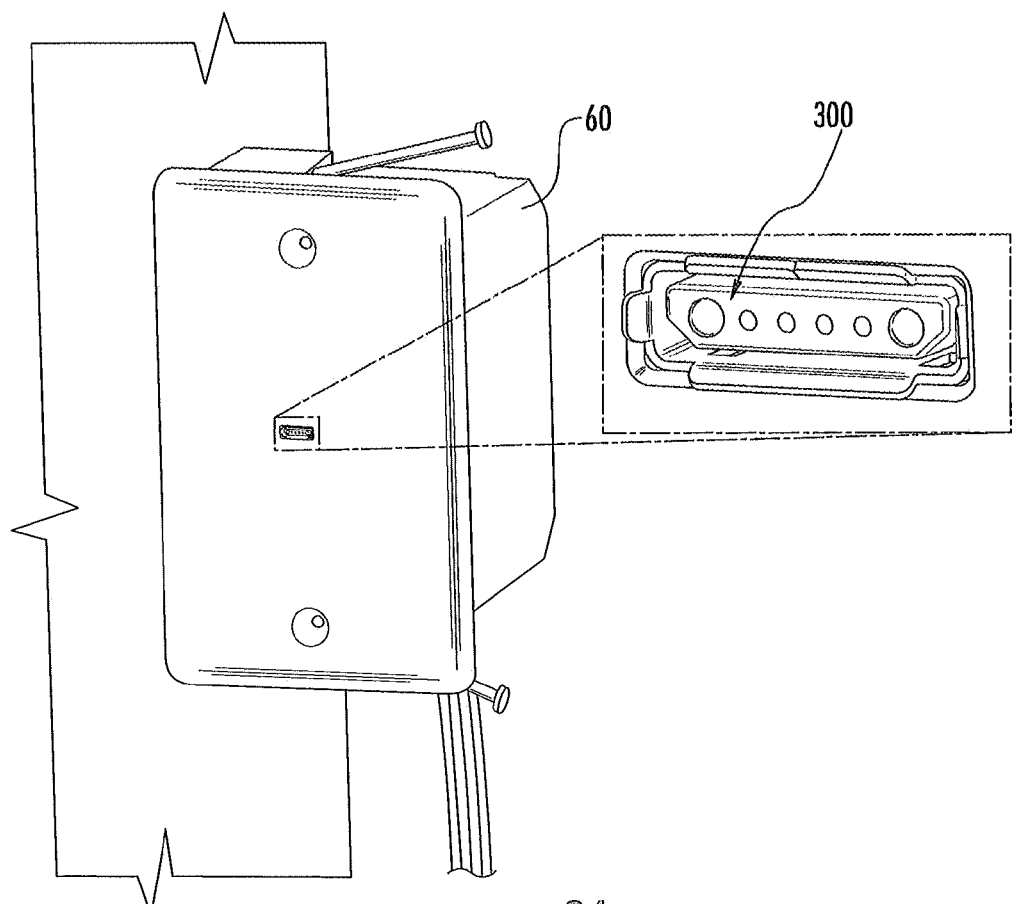
FIG. 24 depicts the mechanical splice fiber optic connector of FIG. 23 disposed within a mounting box.

As with other embodiments, one or more components of connector 300 may optionally have a translucent portion for verifying the quality of the mechanical splice and/or one or more windows in the shell for viewing the translucent portion(s). FIG. 23 is an assembled perspective view of the optical mechanical splice fiber optic connector 300 with the field optical waveguides attached and secured with in shell 330. FIG. 24 depicts the mechanical splice fiber optic connector 300 disposed within box 60.

Connector 300 may also include alignment mating geometry such as guide pin bores 315 for receiving guide pins of a complimentary connector. As best shown in FIG. 22, the guide pin bores 315 are interrupted between a front end and a back end of bore (i.e., a gap between the front and back of the bore). This interrupted bore 315 reduces friction between the guide pin of a complimentary connector and bore 315 and provides a cleaning/removal of debris by wiping when connected and disconnected. Additionally or alternatively, connector 300 and/or components thereof may have a shape that only permits mating with a complimentary connector. For instance, shell 330 can have a shape with chamfered corners at one or more locations for alignment and inhibiting damage from a non-mating connector if attempted by a user. Further, shell 330 can include one or more protrusions 330a for creating a stop or lock for the fully mated position.

Figure 25:
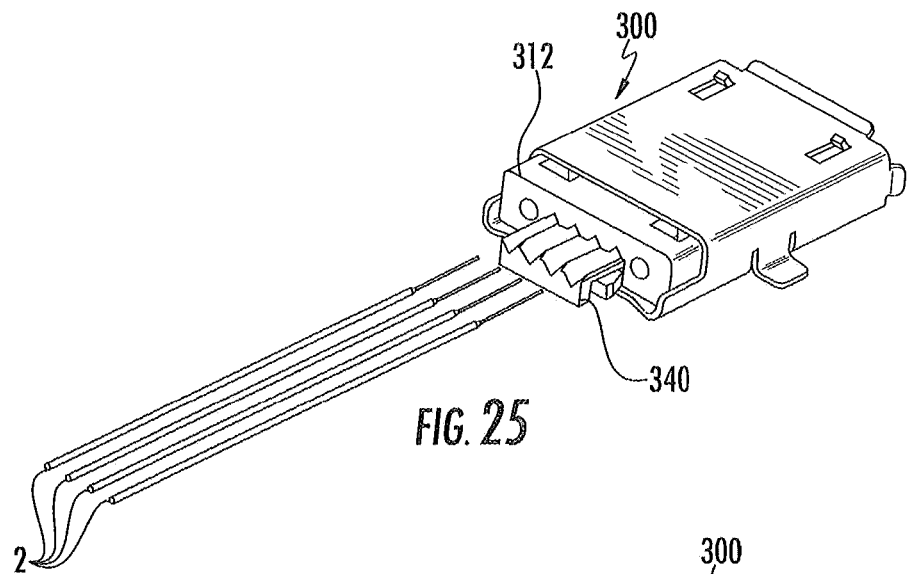
FIGS. 25-27 depict the attachment of the field optical waveguides into the mechanical splice fiber optic connector of FIG. 23.
Figure 26:
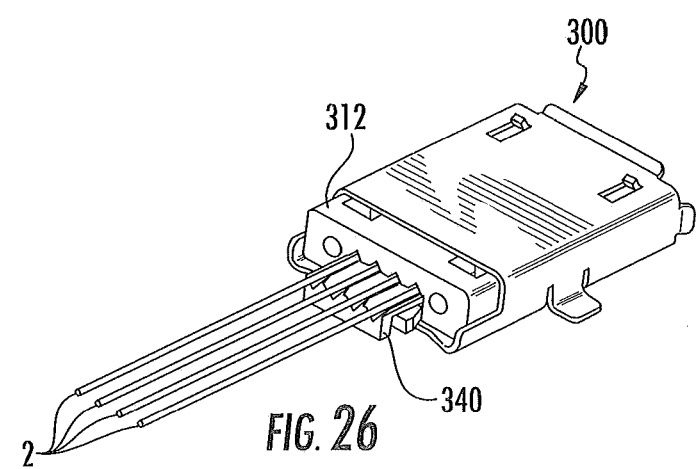
Figure 27:
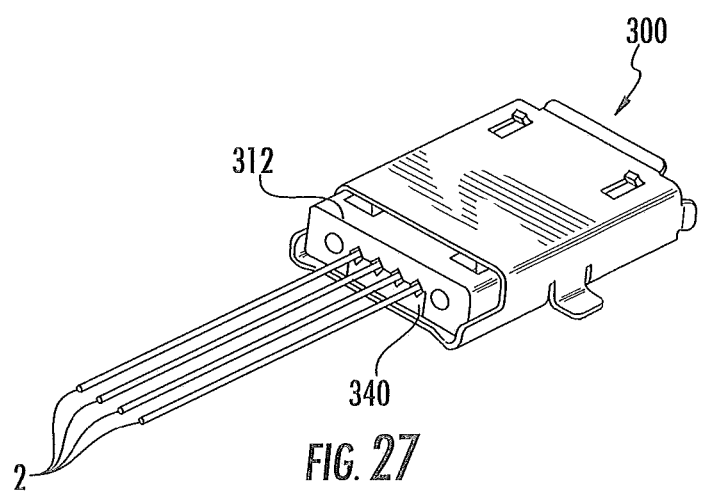
Figure 28:
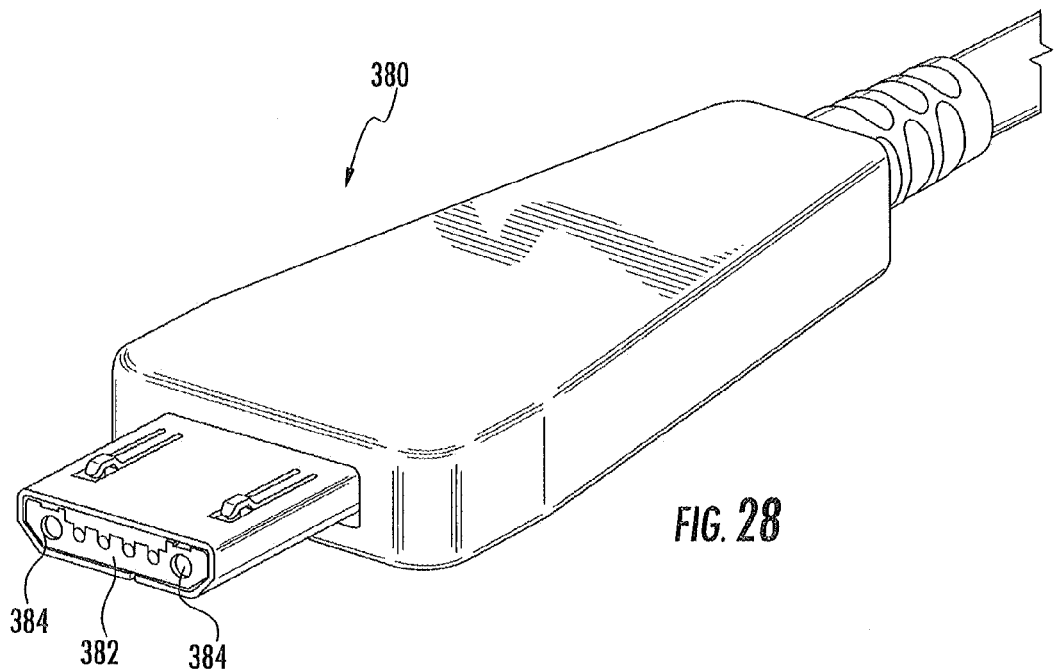
FIG. 28 depicts a complementary plug for mating with the mechanical splice fiber optic connector of FIG. 23.

FIGS. 25-27 depict the attachment of the field optical waveguides to mechanical splice fiber optic connector 300. As shown in FIGS. 25 and 26, mechanical retention component 340 is in an unsecured position (i.e., rearward position) so that optical waveguides 2 may be inserted into the waveguide channels of body 312 to the proper location. Thereafter, mechanical retention component 340 is pushed to a secured position (i.e., forward position) until the locking feature(s) 340a secure the mechanical retention component 340a to body 312, thereby securing the field optical waveguides 2 in connector 300. FIG. 28 depicts a complementary plug 380 for mating with the mechanical splice fiber optic connector 300. Plug 380 may have a translating body 382 or ferrule that moves rearward on guide pins 384 when engaging connector 300. In other words, the guide pins 384 are exposed as the body 382 translates rearward so the guide pins 384 align and enter guide pin bores on connector 300. Connector 300 may also optionally include one or more electrical contacts if desired.

Figure 29:
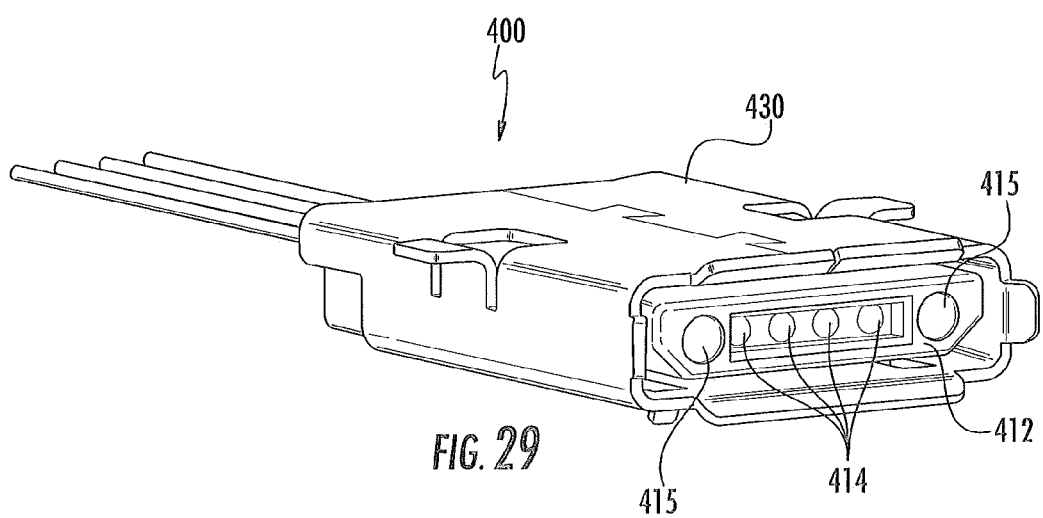
FIGS. 29 and 30 respectively depict an assembled perspective view and exploded view of another mechanical splice fiber optic connector that includes a diffractive cover.
Figure 30:
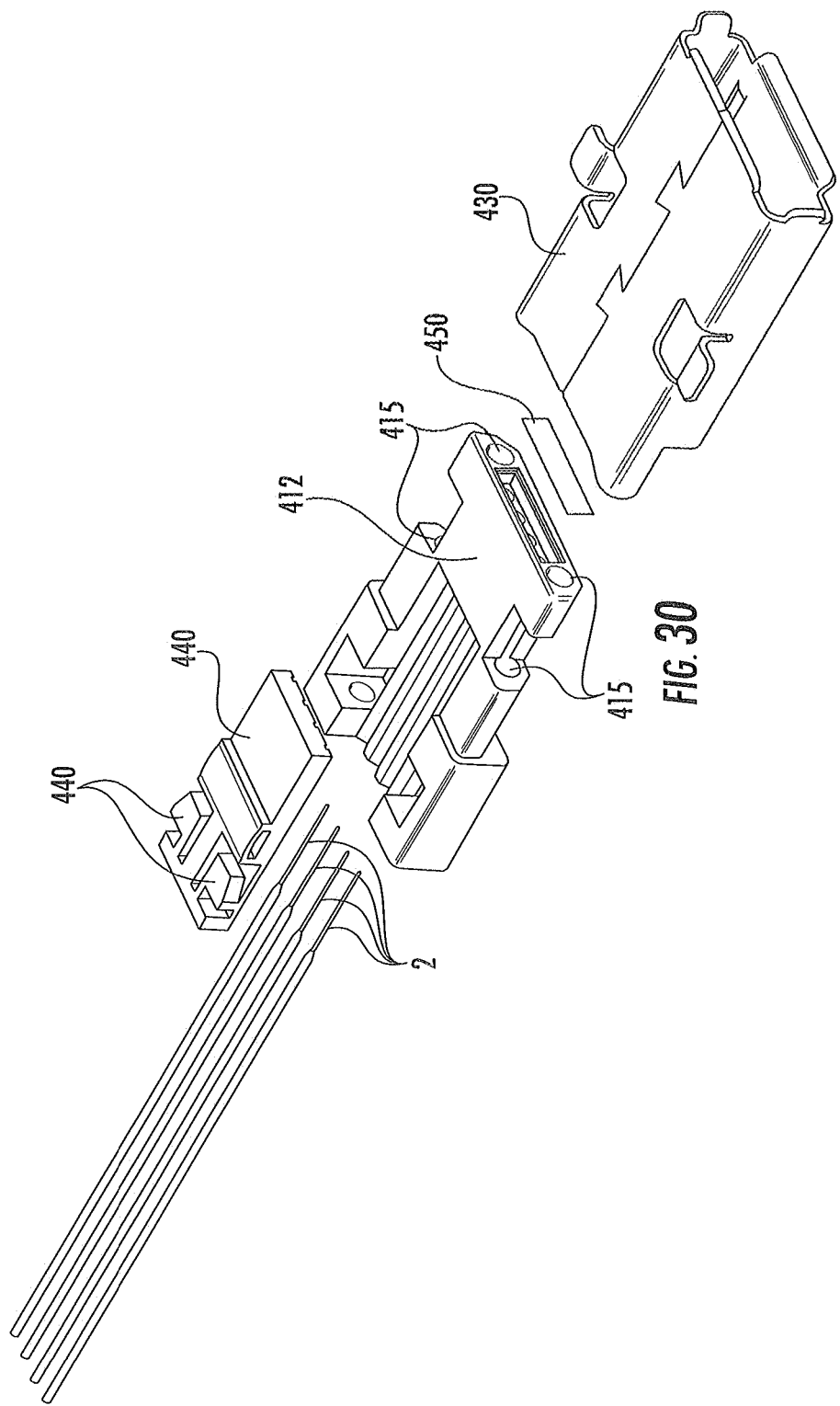

Other variations of connector 300 are possible according to the concepts disclosed. For instance, FIGS. 29 and 30 respectively depict an exploded view and assembled perspective view of another explanatory optical mechanical splice fiber optic connector 400 that only has optical connectivity. As shown, mechanical splice fiber optic connector 400 includes a body 412 having a plurality of grooves 312a or the like for receiving field optical waveguides 2. Connector 400 also includes a shell 430 and a mechanical retention component 440. Body 412 can receive field optical waveguides 2 at the mating interface of body 312 (i.e., front side) or have one or more lenses at the mating interface as desired. As depicted in FIG. 30, body 412 has one or more discrete covers 450 that protects and forms the mating interface of connector 400. Like the connector 300 one or more lenses 414 may optionally be included in the respective bores of the body 412, but the lens elements could be integrated (i.e., molded) into the body 412 providing a single part, thereby requiring fewer assembly steps. Cover 450 is optical transmissive to the optical signal and may be any suitable material. Cover 450 is preferably a diffractive cover and protects optical waveguides/lenses of the mating interface and provides a planar cleaning surface that is easily to clean by the end user. Additionally, like connector 300, connector 400 includes a mechanical retention component 440 that also acts as the actuator for securing the optical waveguides. As best shown in FIG. 29, a plurality of lenses 414 are shown molded into body 412.

Also disclosed are methods of making an optical and/or electrical connection, comprising the steps of: providing a mechanical splice connector having at least one body for receiving at least one field optical fiber, a mechanical retention component for securing at least one optical field fiber to the at least one body; and at least one lens attached to the at least one body; and inserting at least one field fiber into the at least one body and engaging the mechanical retention component to secure the at least one field fiber to the mechanical splice connector. The method may also optionally include providing a mechanical splice connector that further includes a diffractive cover.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present invention without departing from the spirit and scope of the same. Thus, it is intended that the present invention cover the modifications and variations of this invention provided they come within the scope of the appended claims and their equivalents.

We claim:

1. A hybrid mechanical splice connector having an electrical portion and an optical portion, comprising:
   at least one electrical contact;
   a shell;
   at least one body for receiving at least one field optical fiber and securing the electrical contact, wherein the body includes a mechanical retention component for securing at least one optical field fiber to the at least one body where the mechanical retention component can move between an open position and a clamp position.

2. The hybrid mechanical splice connector of claim 1, further including at least one lens or at least one ferrule.

3. The hybrid mechanical splice connector of claim 2, the connector includes one or more springs for biasing at least one lens or at least one ferrule.

4. A hybrid mechanical splice connector having an electrical portion and an optical portion, comprising:
   at least one electrical contact;
   at least one body for receiving a field optical fiber, wherein the body includes one or more fiber guides and a mechanical retention component for securing at least one field optical fiber to the at least one body where the mechanical retention component can move between an open position and a clamp position; and
   at least one lens.

5. The hybrid mechanical splice connector of claim 4, wherein the mechanical retention component rotates about an axis for securing the at least one optical field fiber.

6. The hybrid mechanical splice connector of claim 4, wherein the mechanical retention component secures a buffer portion of the at least one field optical fiber.

7. The hybrid mechanical splice connector of claim 4, the mechanical retention component being a portion of a mechanical splice assembly that includes at least one optical fiber stub.

8. The hybrid mechanical splice connector of claim 4, further including one or more springs for biasing the at least one lens.

9. The hybrid mechanical splice connector of claim 4, the at least one mechanical retention component includes a component being selected from the group including a clamp, a wedge, a ramp, push-button, and a slide.

10. The hybrid mechanical splice connector of claim 4, the connector having a plurality of mechanical splice assemblies.

11. The hybrid mechanical splice connector of claim 4, the mechanical retention component having a buffer clamping structure for retaining the at least one optical field fiber.

12. The hybrid mechanical splice connector of claim 4, the body having alignment mating geometry.

13. The hybrid mechanical splice connector of claim 4, wherein the at least one electrical contact is selected from the group of a wiping contact, a pin contact, a crimp contact, and an insulation displacement contact.

14. The hybrid mechanical splice connector of claim 4, wherein the connector is a portion of a wall-outlet.

15. The hybrid mechanical splice connector of claim 4, wherein the connector is mated with a complementary connector, thereby making an optical connection and an electrical connection.

16. The hybrid mechanical splice connector of claim 4, wherein the electrical portion enters on a first plane and the optical portion enters on a second plane.

17. The hybrid mechanical splice connector of claim 4 being a portion of a cable assembly.

18. The hybrid mechanical splice connector of claim 4, the connector having a USB configuration.

19. The hybrid mechanical splice connector of claim 1, wherein at least one component of the connector has a translucent portion.

20. A hybrid mechanical splice connector having an electrical portion and an optical portion, comprising:
   at least one electrical contact;
   at least one body for receiving a field optical fiber, wherein the body includes one or more fiber guides and a mechanical retention component for securing at least one field optical fiber and a buffer portion of the field fiber to the at least one body, and wherein the mechanical retention component can move between an open position and a clamp position; and
   at least one lens.

21. The hybrid mechanical splice connector of claim 20, wherein the mechanical retention component rotates about an axis for securing the at least one optical field fiber.

22. The hybrid mechanical splice connector of claim 20, wherein at least one component of the connector has a translucent portion.

* * * * *